(12) United States Patent
Kwon et al.

(10) Patent No.: US 11,426,971 B2
(45) Date of Patent: Aug. 30, 2022

(54) COMPOSITE STRUCTURE AND METHOD FOR BARELY VISIBLE IMPACT DAMAGE DETECTION

(71) Applicant: The Boeing Company, Chicago, IL (US)

(72) Inventors: Hyukbong Kwon, Marysville, WA (US); Khanh Mai Pham, Renton, WA (US); Lisa C. Carlson, Auburn, WA (US); Garrett C. Hanson, Everett, WA (US)

(73) Assignee: The Boeing Company, Chicago, IL (US)

( * ) Notice: Subject to any disclaimer, the term of this patent is extended or adjusted under 35 U.S.C. 154(b) by 296 days.

(21) Appl. No.: 16/176,305

(22) Filed: Oct. 31, 2018

(65) Prior Publication Data
US 2019/0061309 A1 Feb. 28, 2019

Related U.S. Application Data

(63) Continuation of application No. 14/882,002, filed on Oct. 13, 2015, now Pat. No. 10,442,154.

(51) Int. Cl.
*B32B 5/02* (2006.01)
*B32B 1/00* (2006.01)
(Continued)

(52) U.S. Cl.
CPC ............ *B32B 5/02* (2013.01); *B29C 70/081* (2013.01); *B29C 70/88* (2013.01); *B32B 1/00* (2013.01);
(Continued)

(58) Field of Classification Search
CPC .... B32B 5/02; B32B 1/00; B32B 3/04; B32B 3/14; B32B 7/12; B32B 2605/18;
(Continued)

(56) References Cited

U.S. PATENT DOCUMENTS

| 4,917,938 A | * | 4/1990 | Mohan | ................. B29C 70/08 |
| | | | | 428/215 |
| 7,861,969 B2 | | 1/2011 | Guzman et al. | |

(Continued)

FOREIGN PATENT DOCUMENTS

| EP | 2 500 706 | 9/2012 |
| GB | 1 324 681 | 7/1973 |
| WO | WO 2009/019511 | 2/2009 |

OTHER PUBLICATIONS

European Patent Office, Extended European Search Report, App. No. 19205483.1 (dated Mar. 11, 2020).
(Continued)

*Primary Examiner* — Brian Handville
(74) *Attorney, Agent, or Firm* — Walters & Wasylyna LLC

(57) ABSTRACT

A composite structure including a composite body having an outer surface, wherein the composite body is elongated along a span axis, and a detection layer connected to the outer surface of the composite body, the detection layer including a plurality of strips, wherein each strip comprises a plurality of glass fibers embedded in a matrix material, is elongated along a detection axis, the detection axis being substantially aligned with the span axis, and is spaced a non-zero distance apart from adjacent strips such that a discontinuity is defined between adjacent strips.

20 Claims, 19 Drawing Sheets

(51) Int. Cl.
  *B32B 3/04* (2006.01)
  *B32B 3/14* (2006.01)
  *B32B 7/12* (2006.01)
  *B64C 1/12* (2006.01)
  *B29C 70/08* (2006.01)
  *B29C 70/88* (2006.01)

(52) U.S. Cl.
  CPC ............... *B32B 3/04* (2013.01); *B32B 3/14* (2013.01); *B32B 7/12* (2013.01); *B64C 1/12* (2013.01); *B32B 2250/02* (2013.01); *B32B 2260/023* (2013.01); *B32B 2260/046* (2013.01); *B32B 2262/101* (2013.01); *B32B 2262/106* (2013.01); *B32B 2262/14* (2013.01); *B32B 2305/72* (2013.01); *B32B 2307/718* (2013.01); *B32B 2307/732* (2013.01); *B32B 2605/18* (2013.01)

(58) Field of Classification Search
  CPC .......... B32B 2250/02; B32B 2260/023; B32B 2260/046; B32B 2262/101; B32B 2262/106; B32B 2262/14; B32B 2305/72; B32B 2307/718; B32B 2307/732; B32B 2307/558; B32B 7/05; B32B 2605/08; B32B 2457/00; B32B 2250/20; B32B 2605/12; B32B 3/10; B32B 5/26; B29C 70/88; B29C 70/081; B64C 1/12; B64C 2001/0072; Y02T 50/40; B64F 5/60; B64F 5/40
  See application file for complete search history.

(56) References Cited

U.S. PATENT DOCUMENTS

| | | |
|---|---|---|
| 9,254,619 B2 | 2/2016 | Rotter et al. |
| 9,561,602 B2 | 2/2017 | Jones et al. |
| 2012/0234110 A1* | 9/2012 | Dubost ............... G01L 5/0052 73/862.381 |
| 2012/0292446 A1* | 11/2012 | Kamaraj ............... B29C 70/34 244/129.1 |
| 2016/0159453 A1 | 6/2016 | Korenaga et al. |
| 2017/0100911 A1 | 4/2017 | Kwon et al. |

OTHER PUBLICATIONS

European Patent Office, "Communication pursuant to Article 94(3) EPC," App. No. 19 205 483.1 (dated Jun. 28, 2022).

* cited by examiner

COMPOSITE STRUCTURE AND METHOD FOR BARELY VISIBLE IMPACT DAMAGE DETECTION

PRIORITY

This application is a continuation-in-part of U.S. Ser. No. 14/882,002 filed on Oct. 13, 2015.

FIELD

This application relates to composite structures and, more particularly, to barely visible impact damage (BVID) detection for composite structures.

BACKGROUND

Composite materials typically include a reinforcement material (e.g., fibers, such as carbon fiber sheets) and a matrix material (e.g., a thermosetting resin, such as an epoxy resin, or a thermoplastic resin). A composite structure may be formed by laying up (e.g., in a mold) multiple layers of composite material, such as by using a prepreg technique or a preform technique, and then curing the resulting layup.

Composite materials, particularly fiber-reinforced plastics, offer various advantages over traditional materials. For example, carbon fiber-reinforced plastics (CFRP) offer an advantageous combination of high strength and relatively light weight (a high strength-to-weight ratio). Therefore, high-performance composite materials, such as carbon fiber-reinforced plastics, can be substituted for traditional materials (e.g., metal and wood) and, as such, find various applications in the aerospace industry, as well as in other industries (e.g., automotive and marine). For example, various aircraft structures, such as stringers (e.g., blade stringers) are constructed from composite materials (e.g., carbon fiber-reinforced plastic).

Structures formed from composite materials are susceptible to barely visible impact damage (BVID) when exposed to a low-energy/low-velocity impact. While the surface of a composite structure with barely visible impact damage may show little or no visible signs of damage, such impacts may cause subsurface damage, such as delamination, which may be difficult to detect without sophisticated nondestructive inspection (NDI).

Accordingly, those skilled in the art continue with research and development efforts in the field of barely visible impact damage.

SUMMARY

A composite structure including a composite body having an outer surface, wherein the composite body is elongated along a span axis, and a detection layer connected to the outer surface of the composite body, the detection layer including a plurality of strips, wherein each strip of the plurality of strips: (i) comprises a plurality of glass fibers embedded in a matrix material; (ii) is elongated along a detection axis, the detection axis being substantially aligned with the span axis; and (iii) is spaced a non-zero distance apart from adjacent strips of the plurality of strips such that a discontinuity is defined between adjacent strips of the plurality of strips.

A method for detecting barely visible impact damage on a composite body, wherein the composite body includes an outer surface and is elongated along a span axis, the method including the step of connecting to the outer surface of the composite body a detection layer including a plurality of strips such that each strip of the plurality of strips is elongated along a detection axis that is substantially aligned with the span axis, wherein each strip of the plurality of strips includes a plurality of glass fibers embedded in a matrix material.

Other examples of the disclosed composite structure and method for barely visible impact damage detection will become apparent from the following detailed description, the accompanying drawings and the appended claims.

DETAILED DESCRIPTION

Figure 1:
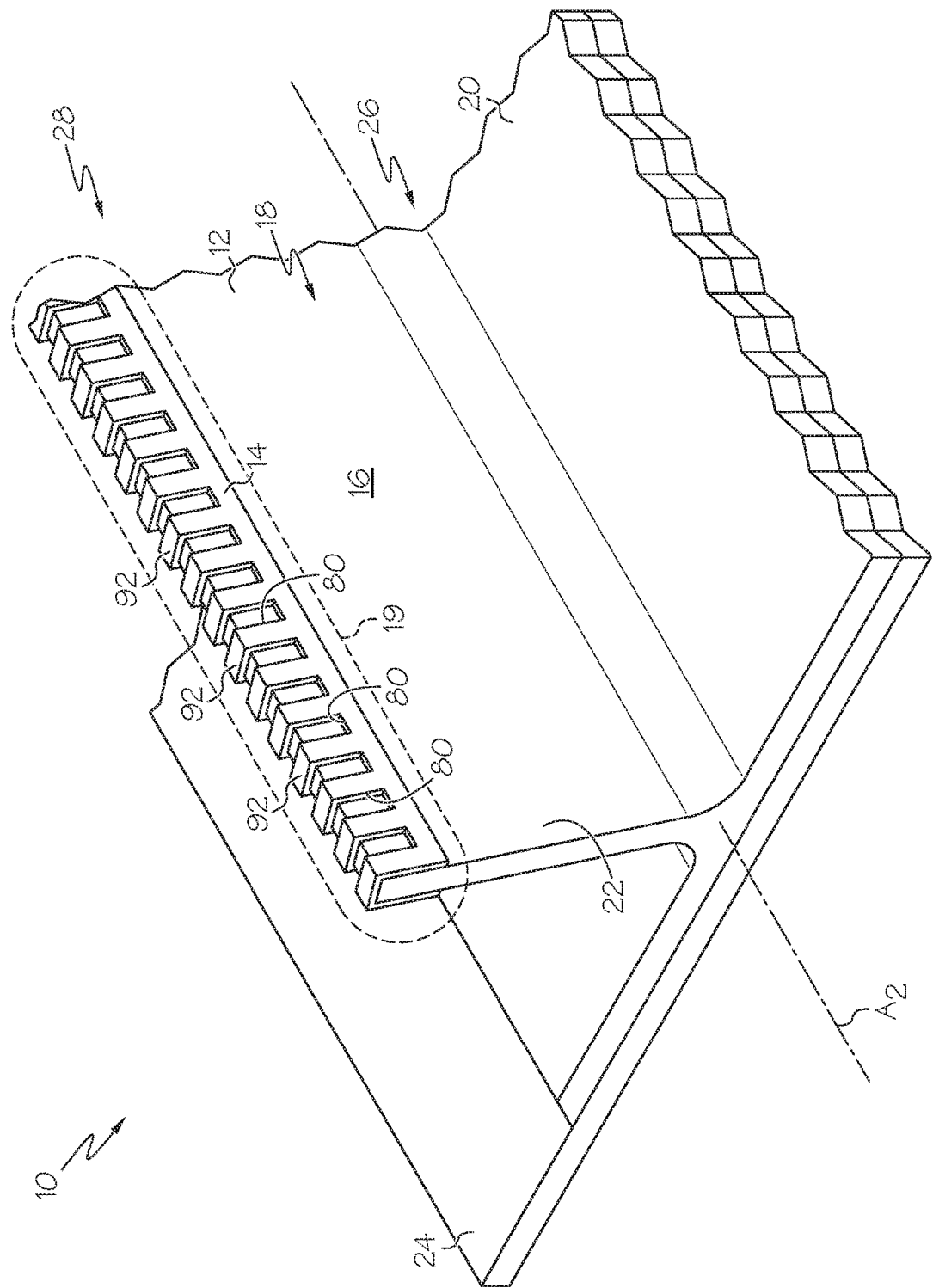
FIG. 1 is a perspective view of one example of the disclosed composite structure.
Figure 2:
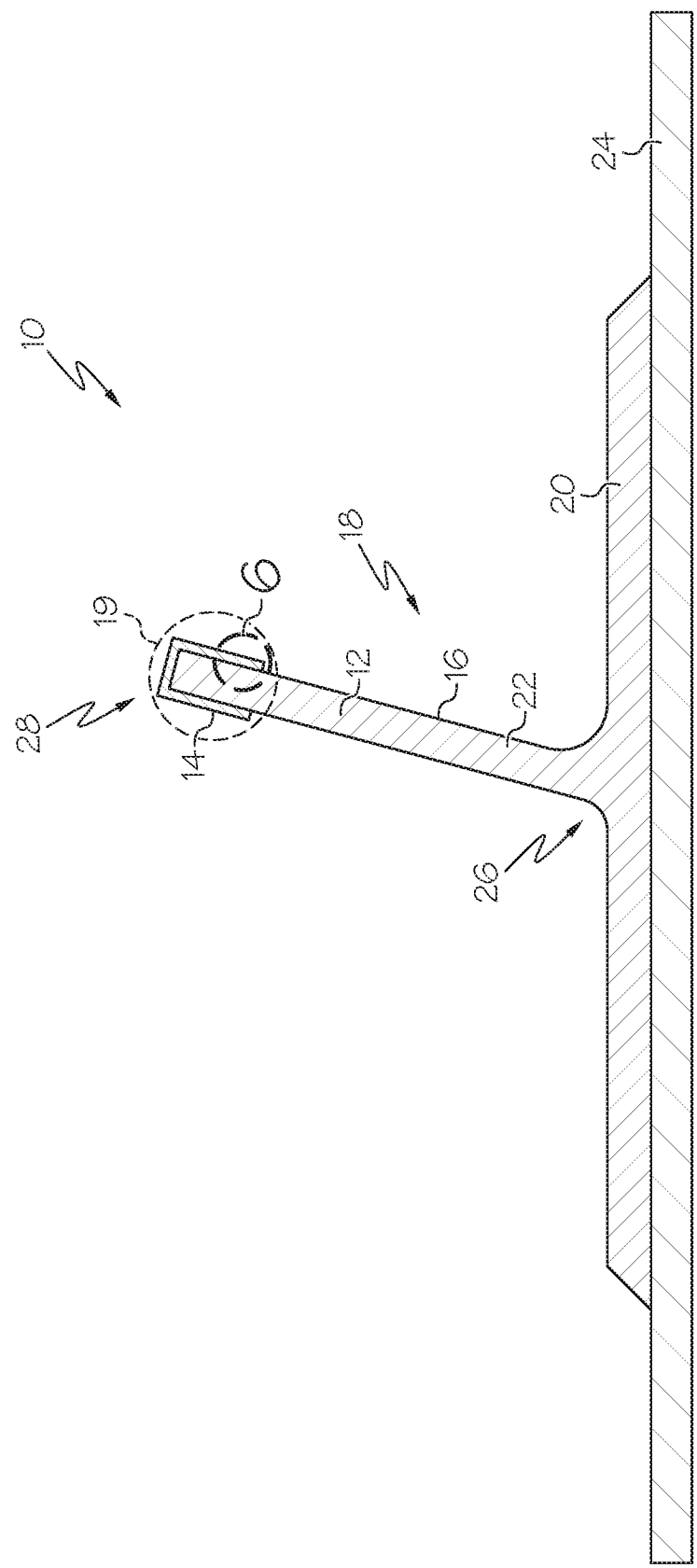
FIG. 2 is a side elevational view, in cross-section, of the composite structure of FIG. 1.

Referring to FIGS. 1 and 2, one example of the disclosed composite structure, generally designated 10, may include a composite body 12 and a detection layer 14. The composite body 12 may include an outer surface 16, and the detection layer 14 may be connected to all or a portion of the outer surface 16, thereby defining a detection zone 19 of the composite structure 10. The detection layer 14 may enhance barely visible impact damage (BVID) visualization within the detection zone 19.

Figure 27:
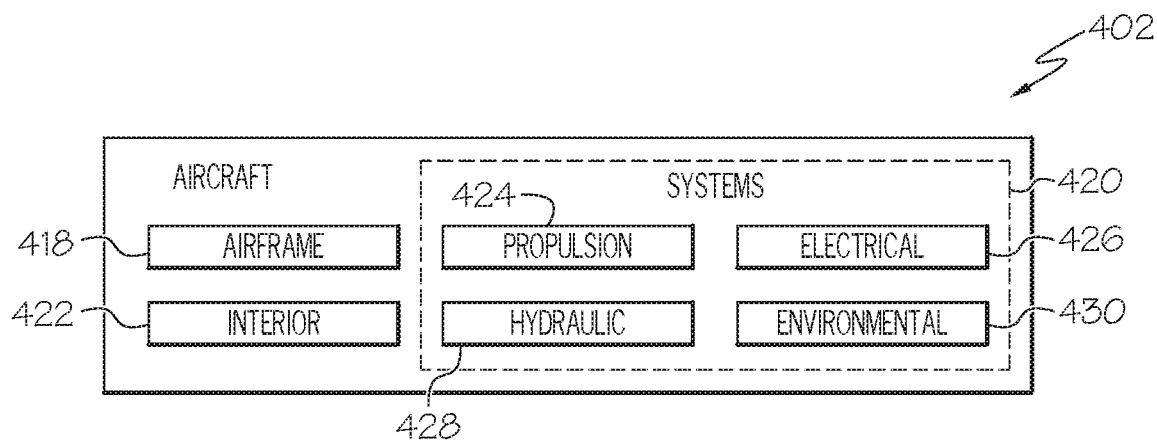
FIG. 27 is a block diagram of an aircraft.

The composite body 12 of the composite structure 10 may be a structural component of a vehicle, such as a structural component of the airframe 418 (FIG. 27) of an aircraft 402 (FIG. 27). While aircraft stringers are specifically shown and described, those skilled in the art will appreciate that the disclosed composite structures 10 may serve as various structures and structural components, whether within the aerospace industry, the automotive industry or otherwise, without departing from the scope of the present disclosure.

As shown in FIGS. 1 and 2, the composite body 12 may be a blade stringer 18, and may include a base portion 20 and a web portion 22. The base portion 20 may be connected to the skin 24 of an aircraft 402 (FIG. 27). The web portion 22 may include a proximal end 26 connected to the base portion 20 and a distal end 28 opposed from the proximal end 26. The detection layer 14 may be connected to the distal end 28 of the web portion 22.

Figure 3:
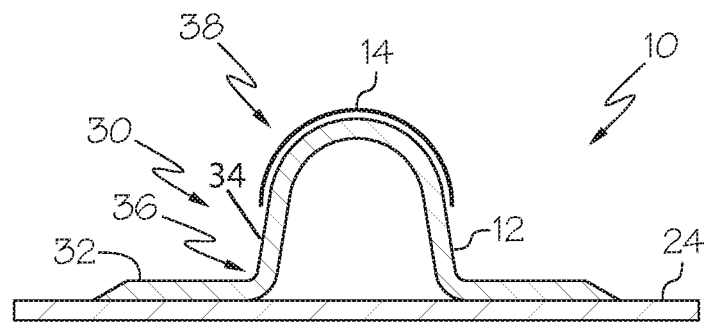
FIG. 3 is a side elevational view, in cross-section, of one variation to the composite structure shown in FIG. 1.

As shown in FIG. 3, in one variation, the composite body 12 of the composite structure 10 may be a hat stringer 30. The hat stringer 30 may include a base portion 32 and a web portion 34. The base portion 32 may be connected to the skin 24 of an aircraft 402 (FIG. 27). The web portion 34, which may be dome-shaped (as shown in FIG. 3), square-shaped, triangular-shaped (commonly referred to as a "witch hat" shape) or the like, may include a proximal end 36 connected to the base portion 32 and a distal end 38 opposed from the proximal end 36. The detection layer 14 may be connected to the distal end 38 of the web portion 34 of the hat stringer 30.

Figure 4:
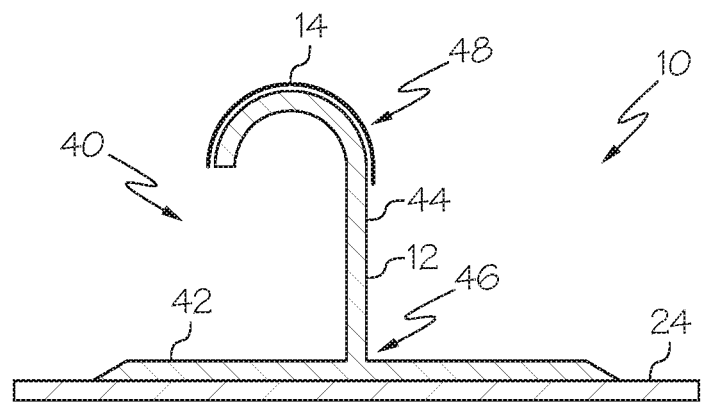
FIG. 4 is a side elevational view, in cross-section, of another variation to the composite structure shown in FIG. 1.

As shown in FIG. 4, in another variation, the composite body 12 of the composite structure 10 may be a J-type stringer 40. The J-type stringer 40 may include a base portion 42 and a J-shaped web portion 44. The base portion 42 may be connected to the skin 24 of an aircraft 402 (FIG. 27). The web portion 44 may include a proximal end 46 connected to the base portion 42 and a distal end 48 opposed from the proximal end 46. The detection layer 14 may be connected to the distal end 48 of the web portion 44 of the J-type stringer 40.

Figure 5:
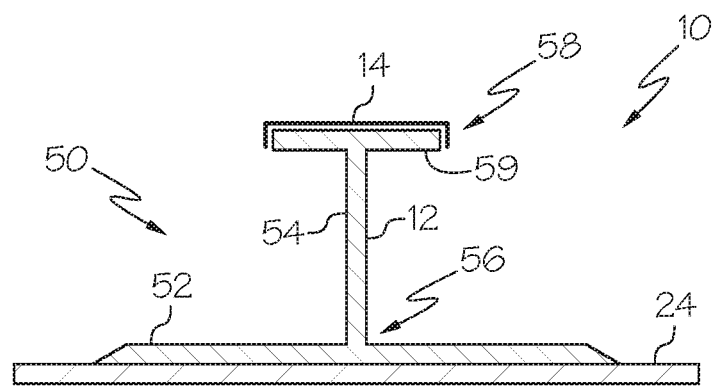
FIG. 5 is a side elevational view, in cross-section, of yet another variation to the composite structure shown in FIG. 1.

As shown in FIG. 5, in yet another variation, the composite body 12 of the composite structure 10 may be an I-type stringer 50. The I-type stringer 50 may include a base portion 52 and a web portion 54. The base portion 52 may be connected to the skin 24 of an aircraft 402 (FIG. 27). The web portion 54 may include a proximal end 56 connected to the base portion 52 and a distal end 58 opposed from the proximal end 56. The distal end 58 of the web portion 54 may include a cap 59, and the detection layer 14 may be connected to the cap 59.

Figure 6:
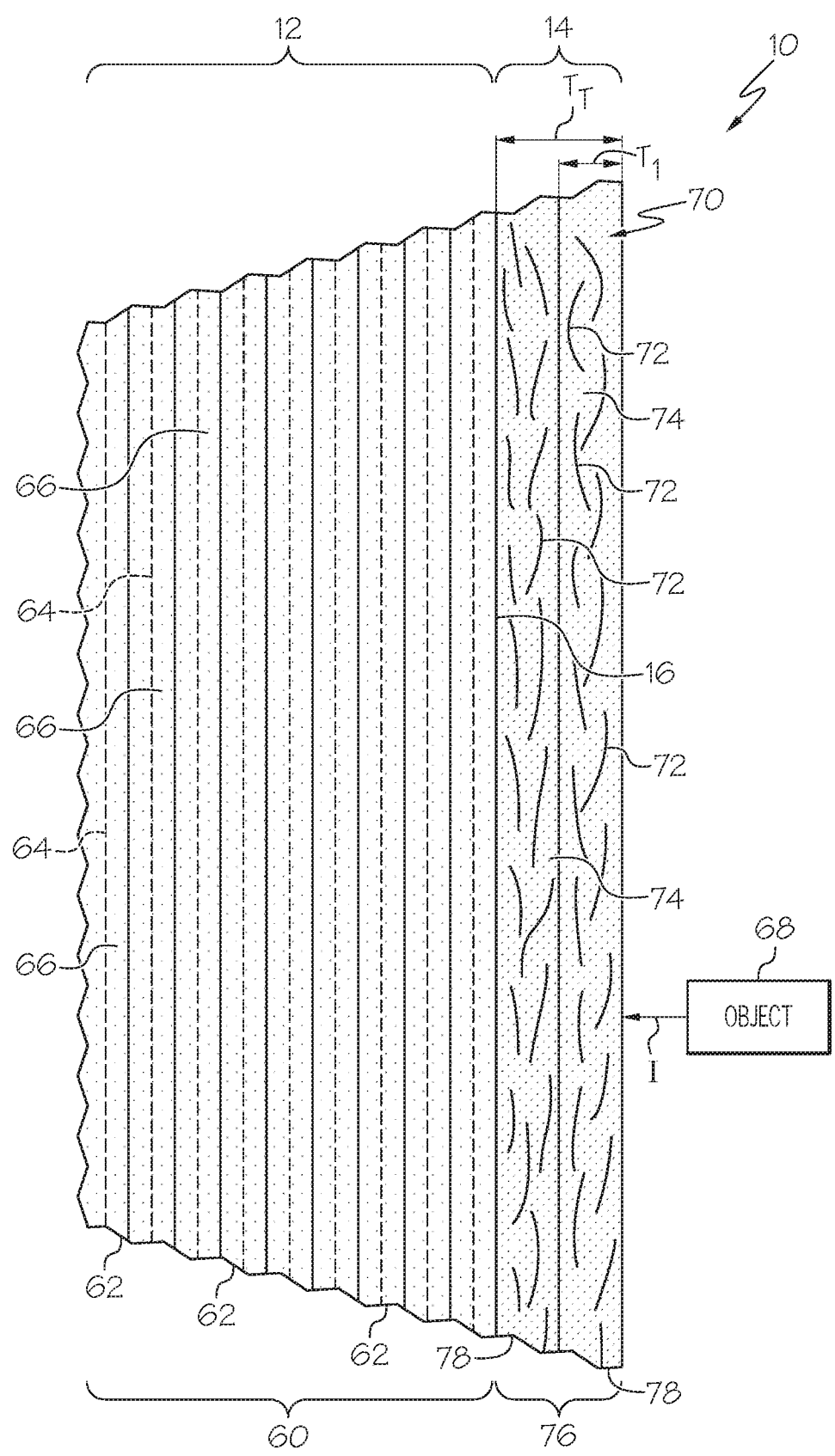
FIG. 6 is a detailed cross-sectional view of a portion of the composite structure shown in FIG. 2.

Referring to FIG. 6, the composite body 12 of the composite structure 10 may have a laminate structure 60 that includes a plurality of composite plies 62. Each ply 62 of the laminate structure 60 may include a reinforcement material 64 and a matrix material 66. The reinforcement material 64 may be embedded in the matrix material 66. The matrix material 66 may be cured prior to placing the composite body 12 into service. The composition of the laminate structure 60, as well as the number of plies 62 forming the laminate structure 60, may widely vary—they are design considerations dictated by, among other things, the intended application of the composite body 12.

In one particular construction, the composite body 12 may be formed from (or may include) carbon fiber-reinforced plastic (CFRP). For example, the reinforcement material 64 of each ply 62 of the laminate structure 60 of the composite body 12 may include carbon fibers, such as a carbon fiber fabric, and the matrix material 66 may be a thermosetting resin, such as epoxy resin, or, alternatively, a thermoplastic resin, such as polyether ether ketone (PEEK), polyether ketone ketone (PEKK), polyphenaline sulfide (PPS), polyethylene, polypropylene, and polystyrene. Additional reinforcement materials may be used in combination with carbon fibers without departing from the scope of the present disclosure.

Still referring to FIG. 6, the detection layer 14 of the composite structure 10 may be connected to the outer surface 16 of the composite body 12. Therefore, in the event an object 68 impacts (arrow I) the composite structure 10 within the detection zone 19 (FIGS. 1 and 2), the impact (arrow I) will be received by the detection layer 14. Because of the disclosed composition and structure of the detection layer 14, such an impact (arrow I) may leave an indication on the composite structure 10 that is substantially more visible as compared to the same impact (arrow I) occurring on a composite structure 10 with the detection layer 14 omitted.

The detection layer 14 of the composite structure 10 may be formed from (or may include) a glass fiber-reinforced plastic 70, which is commonly referred to as fiberglass. The glass fiber-reinforced plastic 70 may include glass fibers 72 and a matrix material 74, wherein the glass fibers 72 are embedded in the matrix material 74. The matrix material 74 may be (or may include) a thermosetting resin or, alternatively, a thermoplastic resin. As one specific, non-limiting example, the matrix material 74 may be an epoxy resin.

As shown in FIG. 6, the detection layer 14 may be a stacked structure 76 that includes multiple plies 78 of glass fiber-reinforced plastic 70 (only two plies 78 are shown in FIG. 6). While not specifically shown, it is also contemplated that the detection layer 14 may include only a single ply 78. Each ply 78 of the detection layer 14 may have a cross-sectional thickness $T_1$. As one non-limiting example, the cross-sectional thickness $T_1$ may range from about 0.003 inch (0.0762 millimeters) to about 0.015 inch (0.381 millimeters).

The detection layer 14 may have a total cross-sectional thickness $T_T$, which may depend on the total number of plies 78 and the cross-sectional thickness $T_1$ of each ply 78. It is presently believed that the visual indication created by an impact (arrow I) within the detection zone 19 (FIGS. 1 and 2) may become more substantial as the total cross-sectional thickness $T_T$ of the detection layer 14 increases. However, the total weight of the composite structure 10 also increases as the total cross-sectional thickness $T_T$ of the detection layer 14 increases. Therefore, those skilled in the art will appreciate the need to optimize the total cross-sectional thickness $T_T$ of the detection layer 14 based on the particular application. For example, in an aerospace application (e.g., for the blade stringer 18 shown in FIGS. 1 and 2) the total cross-sectional thickness $T_T$ of the detection layer 14 may range from about 0.003 inch (0.0762 millimeters) to about 0.050 inch (1.27 millimeters).

Referring back to FIG. 1, the detection layer 14 of the composite structure 10 may be discontinuous. As such, portions of the underlying composite body 12 are readily visible through the detection layer 14. Without being limited to any particular theory, it is believed that using a detection layer 14 that includes glass fibers 72 (FIG. 6) and that is discontinuous (rather than continuous) substantially increases the amount of exposed edge 80 within the detection layer 14, thereby exposing more glass fibers 72 of the glass fiber-reinforced plastic 70 (FIG. 6). As such, an impact (arrow I in FIG. 6) with relatively less energy may create relatively more visual indication of an impact.

Furthermore, without being limited to any particular theory, it is believed that a composite structure 10 having a detection layer 14 that includes glass fibers 72 (FIG. 6) and that is discontinuous is less likely to accumulate a static charge, as compared to a composite structure having a detection layer that includes glass fibers, but that is continuous. As such, the disclosed composite structure 10 may be suitable for use within regions with high electrostatic charges, such as within the fuel tank of an aircraft.

Figure 7:
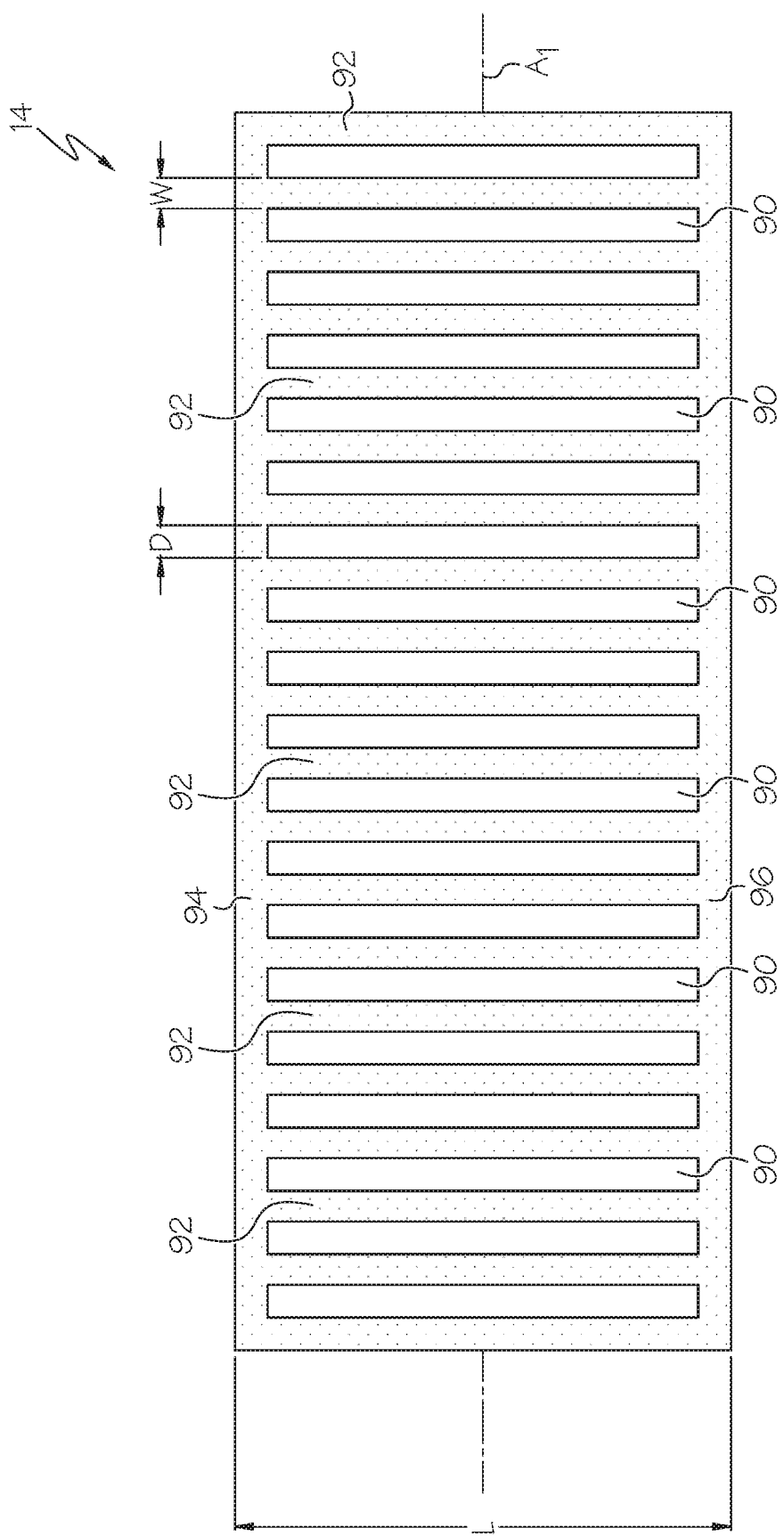
FIG. 7 is a plan view of the detection layer of the composite structure of FIG. 1, shown prior to application of the detection layer to the composite body.

Referring now to FIG. 7, in one particular implementation, the detection layer 14 of the composite structure 10 (FIG. 1) may extend along a longitudinal axis $A_1$, and may be rendered discontinuous by forming (e.g., cutting) slots 90 within the plies 78 (FIG. 6) of glass fiber-reinforced plastic 70 (FIG. 6) forming the detection layer 14. The slots 90 may define a plurality of strips 92, which may laterally extend between a first extension member 94 and a second extension member 96. Therefore, the detection layer 14 may have a ladder-like configuration in plan view (FIG. 7), wherein the longitudinally-extending extension members 94, 96 of the detection layer 14 connect together the strips 92 and maintain the strips 92 at the desired spacing.

Each strip 92 of the detection layer 14 may have a width W, a length L, and may be longitudinally spaced a distance D from adjacent strips 92. The length L of each strip 92 may depend on, among other things, the size and/or shape of the underlying composite body 12 (FIG. 1). The width W of each strip 92 and the distance D between adjacent strips 92 may be a design consideration subject to optimization for a given composite body 12 and application. In one specific, non-limiting aerospace application (e.g., for the blade stringer 18 shown in FIGS. 1 and 2), the strips 92 may have a width W ranging from about 0.1 inch (2.54 millimeters) to about 0.5 inch (12.7 millimeters), such as about 0.25 inch (6.35 millimeters), and a distance D between adjacent strips 92 ranging from about 0.1 inch (2.54 millimeters) to about 0.5 inch (12.7 millimeters), such as about 0.25 inch (6.35 millimeters).

As shown in FIG. 1, the detection layer 14 may be connected to the composite body 12 such that the longitudinal axis $A_1$ (FIG. 7) of the detection layer 14 is substantially aligned with the longitudinal axis $A_2$ of the composite body 12. Therefore, in the case of the blade stringer 18 shown in FIG. 1, the detection layer 14 may be folded over the distal end 28 of the web portion 22 to form a longitudinally extending row of spaced apart strips 92 along the length of the web portion 22.

Figure 8:
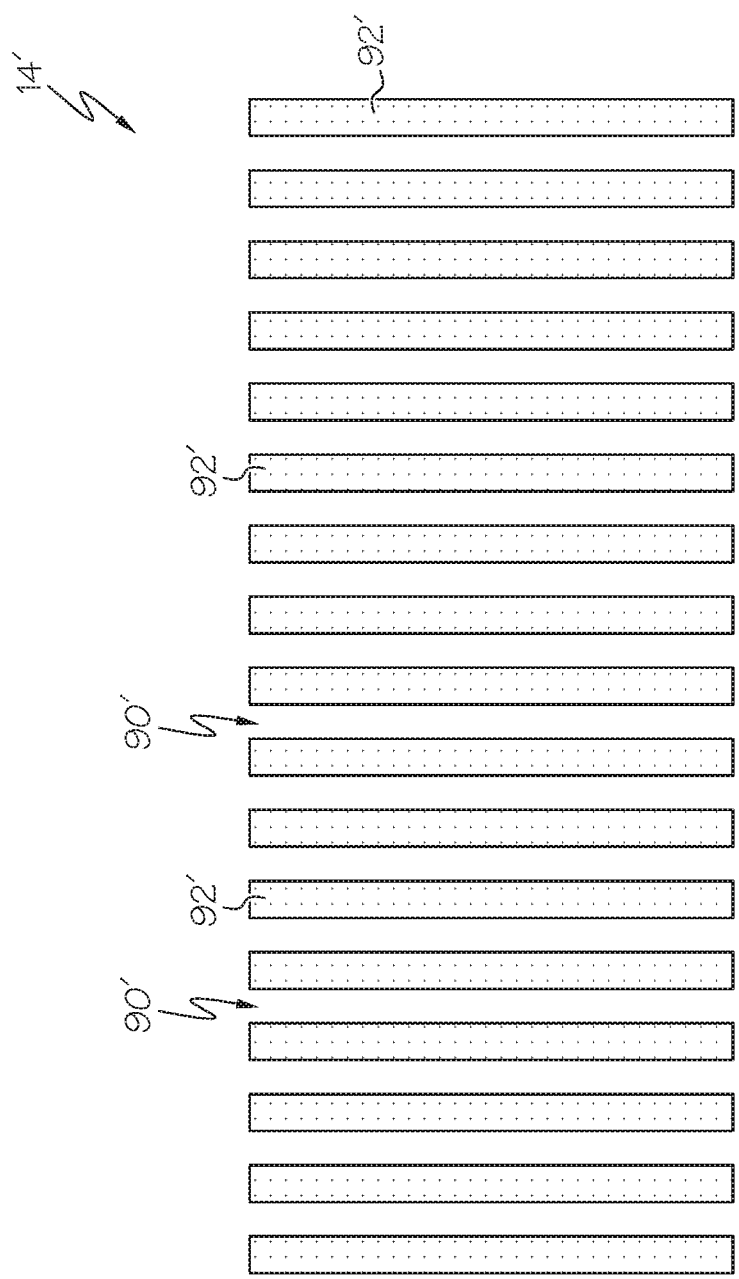
FIG. 8 is a plan view of one variation to the detection layer shown in FIG. 7.

As shown in FIG. 8, in one alternative implementation, the extension members 94, 96 (FIG. 7) may be omitted such that the detection layer 14' of the composite structure 10 (FIG. 1) includes a plurality of separate (not interconnected) strips 92'. Slots 90' may be defined between adjacent strips 92' of the detection layer 14'

At this point, those skilled in the art will appreciate that various techniques may be used to render discontinuous the detection layer 14. While the formation of regular and uniform slots 90, 90' (FIGS. 7 and 8) is shown and described, any regular or irregular openings, whether patterned uniformly or not, may be sufficient to achieve discontinuity and the desired exposed edges 80, without departing from the scope of the present disclosure.

Figure 9:
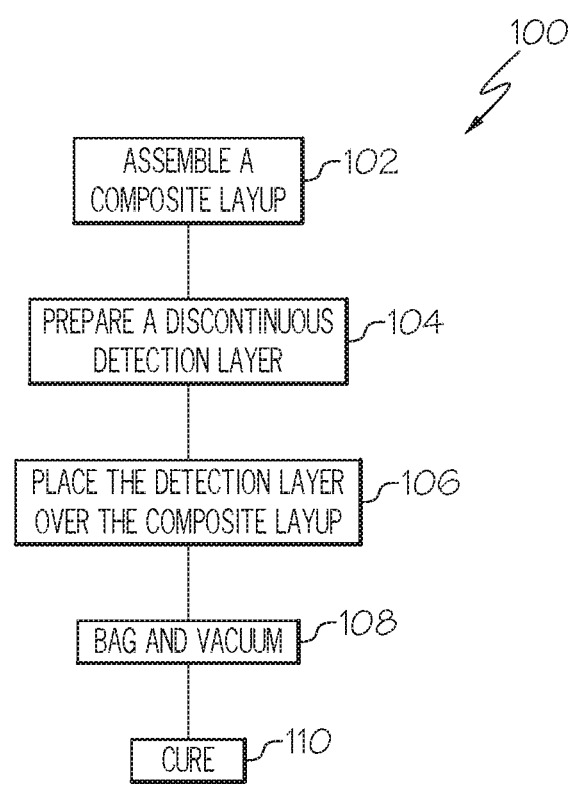
FIG. 9 is a flow diagram depicting one example of the disclosed method for manufacturing a composite structure.

Also disclosed is a method for manufacturing the disclosed composite structure 10 using a co-curing technique. Referring to FIG. 9, one example of the disclosed co-curing manufacturing method, generally designated 100, may begin at Block 102 with the step of laying up a plurality of composite plies 62 (FIG. 6) to form the laminate structure 60 (FIG. 6) of the composite body 12 (FIG. 1). The composite plies 62 may be prepreg plies and, therefore, merely require curing. However, it is also contemplated that a pre-form technique may be used, thereby requiring both resin infusion and curing.

At Block 104, a detection layer 14 (FIGS. 6 and 7) may be prepared. Preparation of the detection layer 14 may include assembling a stacked structure 76 (FIG. 6) including multiple plies 78 (FIG. 6) of glass fiber-reinforced plastic 70 (FIG. 6). Preparation of the detection layer 14 may further include cutting (e.g., die-cutting) the stacked structure 76 to achieve the desired discontinuous configuration (e.g., a ladder-like configuration, as shown in FIG. 7, or a plurality of separate strips, as shown in FIG. 8).

At Block 106, the detection layer 14 (FIG. 1) may be placed over the composite body 12 (FIG. 1) to form an uncured composite body/detection layer assembly. Placement of the detection layer 14 may require consideration of the desired location of the detection zone 19 (FIG. 1) of the resulting composite structure 10 (FIG. 1). For example, when the composite body 12 is a stringer 18 (FIG. 1), the detection layer 14 may be placed over the distal end 28 (FIG. 1) of the web portion 22 (FIG. 1) of the stringer 18, as best shown in FIGS. 1 and 2.

At Block 108, the composite body/detection layer assembly may optionally be exposed to a vacuum load. For example, the composite body/detection layer assembly may be placed into a vacuum bag and a vacuum may be drawn within the bag. The vacuum load may compact the composite body/detection layer assembly.

At Block 110, the composite body/detection layer assembly may be cured. For example, the composite body/detection layer assembly may be placed into an autoclave set at a pre-determined temperature and may remain within the autoclave for a predetermined amount of time.

Thus, the disclosed co-curing manufacturing method 100 may connect the detection layer 14 (FIG. 1) to the composite body 12 (FIG. 1) without the need for a secondary bonding process. Therefore, the disclosed co-curing manufacturing method 100 may be suitable for use in connection with composite bodies 12 that do not require certain post-curing processing proximate the detection zone 19 (FIG. 1), such as cutting/trimming (e.g., a trimmed blade stringer) or secondary bonding (e.g., bonding of cap 59 to form an I-type stringer 50, as shown in FIG. 5).

Figure 10:
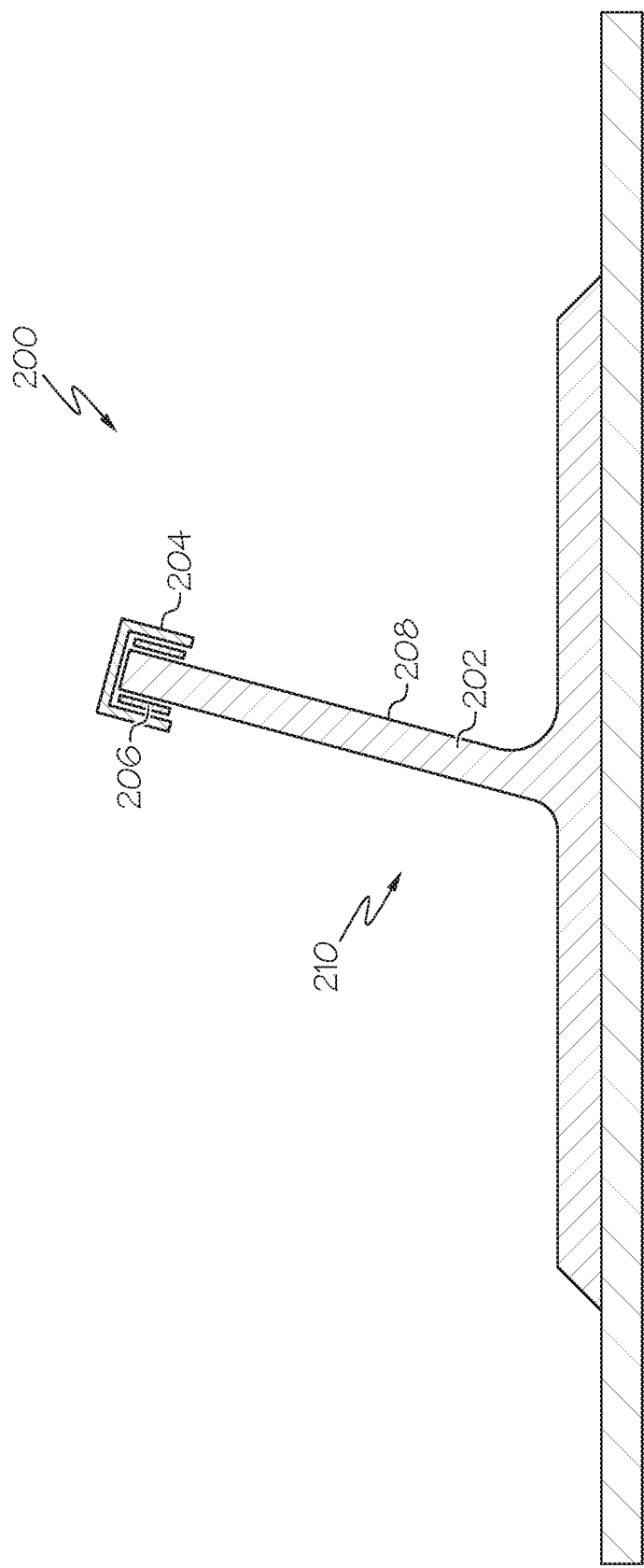
FIG. 10 is a side elevational view, in cross-section, of an alternative example of the disclosed composite structure.

Referring to FIG. 10, another example of the disclosed composite structure, generally designated 200, may include a composite body 202, a detection layer 204 and an adhesive 206. The composite body 202 may include an outer surface 208, and the detection layer 204 may be connected to the outer surface 208 of the composite body 202 by way of the adhesive 206.

Thus, the composite structure 200 may be substantially similar to the composite structure 10 shown in FIG. 1 and described herein. However, rather than effecting connection between the detection layer 14 and the composite body 12 by co-curing, as in the case for the composite structure 10, the connection between the detection layer 204 and the composite body 202 of the composite structure 200 may be effected by the adhesive 206.

Various adhesives may be used in connection with the composite structure 200. Those skilled in the art will appreciate that adhesive selection may require consideration of the composition of the composite body 202 and the detection layer 204, as well as other considerations, such as the intended application of the resulting composite structure 200. Non-limiting examples of adhesives suitable for bonding a glass/epoxy detection layer 204 to a carbon fiber reinforced plastic composite body 202 include epoxies (e.g., one-part epoxies or two-part epoxies, including films, pastes and liquids), silicone adhesives, polyester adhesives, urethane adhesives and acrylic adhesives.

Figure 11:
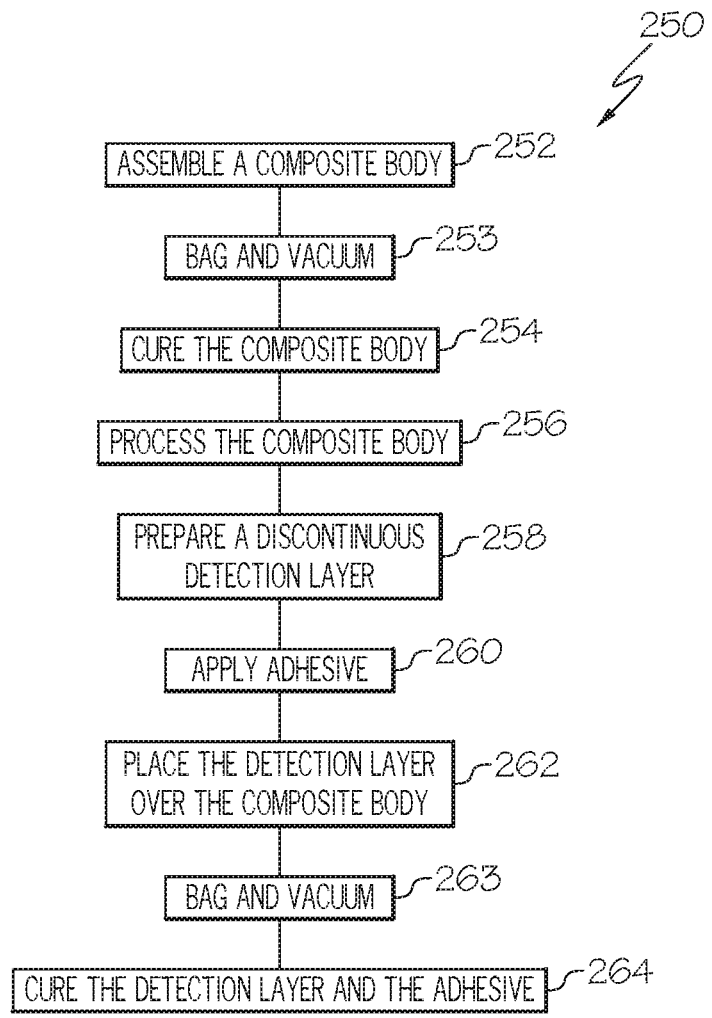
FIG. 11 is a flow diagram depicting another example of the disclosed method for manufacturing a composite structure.

Also disclosed is a method for manufacturing the disclosed composite structure 200 using a bonding technique. Referring to FIG. 11, one example of the disclosed bonding manufacturing method, generally designated 250, may begin at Block 252 with the step of laying up a plurality of composite plies 62 (FIG. 6) to form the laminate structure 60 (FIG. 6) of the composite body 202 (FIG. 10). The composite plies 62 may be prepreg plies and, therefore, merely require curing. However, it is also contemplated that a pre-form technique may be used, thereby requiring both resin infusion and curing.

At Block 253, the uncured composite body 202 (FIG. 10) may optionally be exposed to a vacuum load. For example, the uncured composite body 202 may be placed into a vacuum bag and a vacuum may be drawn within the bag. The vacuum load may compact the uncured composite body 202.

At Block 254, the composite body 202 (FIG. 10) may be cured. For example, the composite body 202 may be placed into an autoclave set at a pre-determined temperature for a predetermined amount of time.

At Block 256, the composite body 202 (FIG. 10) may be processed, such as by cutting/trimming the composite body 202, surface preparation (e.g., for receiving an adhesive) and/or connecting additional members (e.g., a cap 59 (FIG. 5)) to the composite body 202. For example, the composite body 202 may be a blade stringer 210, as shown in FIG. 10, and the distal end 28 (FIG. 1) of the web portion 22 (FIG. 1) of the blade stringer 210 may be cut/trimmed.

At Block 258, a detection layer 204 (FIG. 10) may be prepared. Preparation of the detection layer 204 may include assembling a stacked structure 76 (FIG. 6) including multiple plies 78 (FIG. 6) of glass fiber-reinforced plastic 70 (FIG. 6). Preparation of the detection layer 204 may further include cutting (e.g., die-cutting) the stacked structure 76 to achieve the desired discontinuous configuration (e.g., a ladder-like configuration, as shown in FIG. 7, or a plurality of separate strips, as shown in FIG. 8).

At Block 260, an adhesive 206 (FIG. 10) may be applied. The adhesive 206 may be applied to the composite body 202 (FIG. 10), to the detection layer 204 (FIG. 10) or to both the composite body 202 and the detection layer 204.

At Block 262, the detection layer 204 (FIG. 10) may be placed over the composite body 202 (FIG. 10). Placement of the detection layer 204 may require consideration of the desired location of the detection zone 19 (FIG. 1) of the resulting composite structure 200 (FIG. 10).

At Block 263, the composite body 202/adhesive 206/detection layer 204 assembly (see FIG. 10) may optionally be exposed to a vacuum load. For example, the composite body 202/adhesive 206/detection layer 204 assembly may be placed into a vacuum bag and a vacuum may be drawn within the bag. The vacuum load may compact the composite body 202/adhesive 206/detection layer 204 assembly.

At Block 264, the composite body 202/adhesive 206/detection layer 204 assembly (see FIG. 10) may be cured. As one example, curing the composite body 202/adhesive 206/detection layer 204 assembly may include allowing the composite body 202/adhesive 206/detection layer 204 assembly to set for a predetermined amount of time. As another example, curing the composite body 202/adhesive 206/detection layer 204 assembly may include heating the composite body 202/adhesive 206/detection layer 204 assembly, such as in an autoclave. As yet another example, curing the composite body 202/adhesive 206/detection layer 204 assembly may include exposing the composite body 202/adhesive 206/detection layer 204 assembly to a particular wavelength of electromagnetic radiation (e.g., ultraviolet light).

Thus, the disclosed bonding manufacturing method 250 may be used as an alternative to the disclosed co-curing manufacture method 100. For example, the disclosed co-curing manufacture method 100 may not be suitable for applications requiring processing (Block 256) of a cured composite body prior to application of a detection layer to the composite body. Therefore, in such cases, the disclosed bonding manufacturing method 250 may be used.

Figure 12:
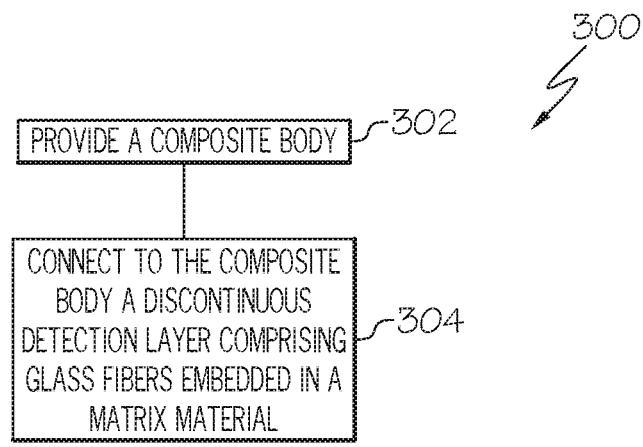
FIG. 12 is a flow diagram depicting one example of the disclosed method for barely visible impact damage detection.

Referring now to FIG. 12, one example of the disclosed method for barely visible impact damage detection, generally designated 300, may begin at Block 302 with the step of providing a composite body 12 (FIG. 1). The composite body 12 may include an outer surface 16 (FIG. 1) and a plurality of composite plies 62 (FIG. 6).

At Block 304, a detection layer 14 (FIG. 1) may be connected to the outer surface 16 (FIG. 1) of the composite body 12 (FIG. 1). The detection layer 14 may be discontinuous, and may include glass fibers embedded in a matrix material (e.g., epoxy resin). In one expression, the connection between the detection layer 14 and the composite body 12 may be effected by co-curing the detection layer 14 with the composite body 12. In another expression, the connection between the detection layer 14 and the composite body 12 may be effected by bonding the detection layer 14 to the composite body 12, such as with an adhesive (e.g., a two-part epoxy adhesive).

Figure 13:
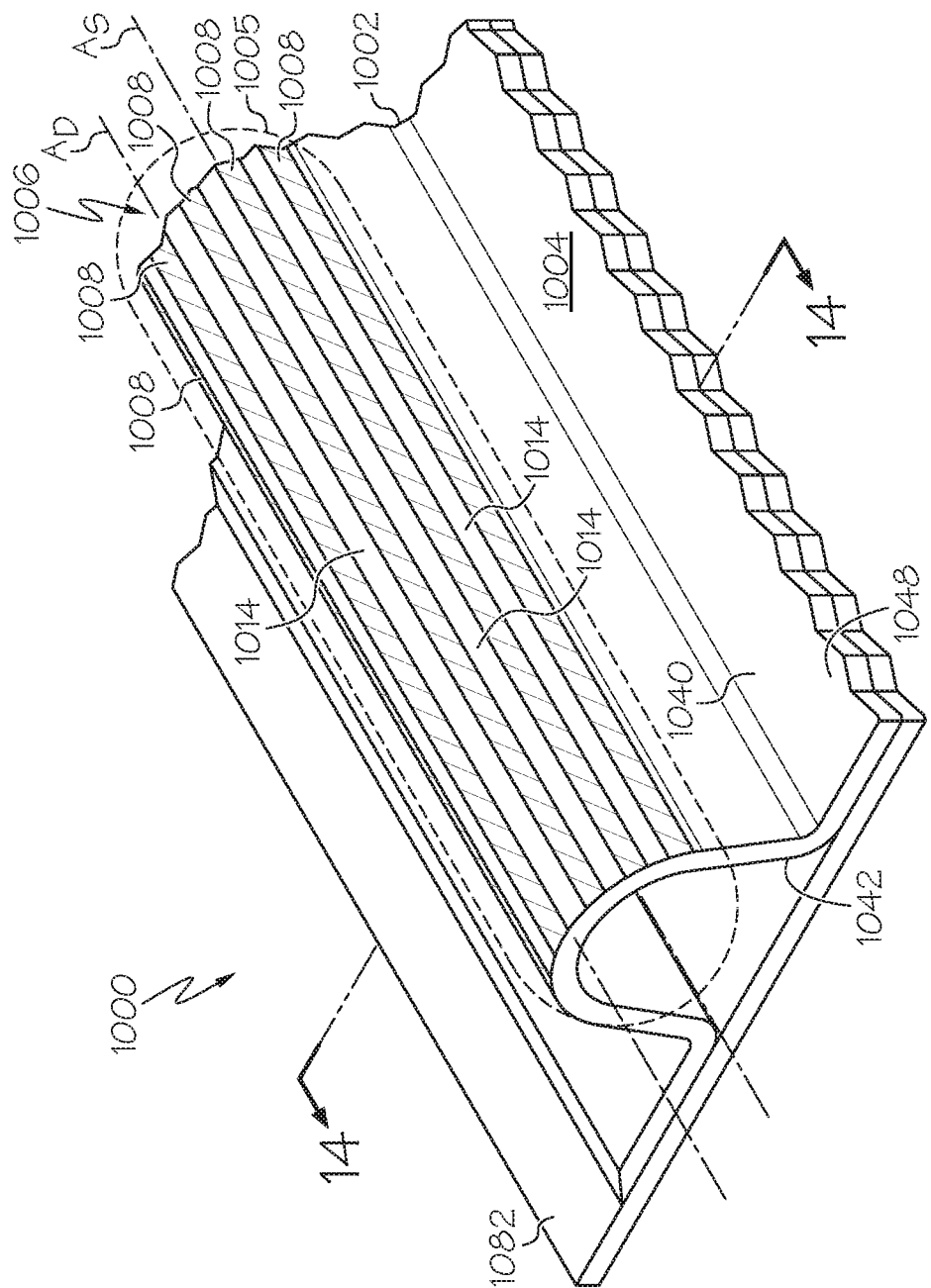
FIG. 13 is a perspective view of another example of the disclosed composite structure.
Figure 14:
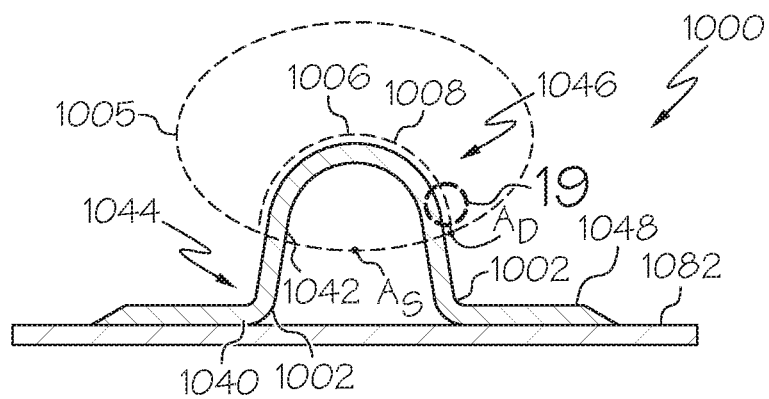
FIG. 14 is a side elevational view, in cross-section, of the composite structure of FIG. 13.

Referring to FIGS. 13 and 14, another example of the disclosed composite structure, generally designated 1000, may include a composite body 1002 and a detection layer 1006. The composite body 1002 is elongated along a span axis $A_S$ and includes an outer surface 1004. The detection layer 1006 is connected to all or a portion of the outer surface 1004 of the composite body 1002, thereby defining a detection zone 1005 of the composite structure 1000. The detection layer 1006 may enhance barely visible impact damage (BVID) visualization within the detection zone 1005.

The composite structure 1000 may be a structural component of a vehicle, such as a structural component of the airframe 418 (FIG. 27) of an aircraft 402 (FIG. 27). While aircraft stringers are specifically shown and described, those skilled in the art will appreciate that the disclosed composite structures 1000 may serve as various structures and structural components, whether within the aerospace industry, the automotive industry or otherwise, without departing from the scope of the present disclosure.

As shown in FIGS. 13 and 14, the composite body 1002 of the composite structure 1000 may be a hat stringer 1040. The hat stringer 1040 may include a base portion 1048 and a web portion 1042. The base portion 1048 may be connected to an aircraft skin 1082 or other underlying structure. The web portion 1042, which may be dome-shaped (as shown in FIG. 14), square-shaped, triangular-shaped (commonly referred to as a "witch hat" shape) or the like, may include a proximal portion 1044 connected to the base portion 1048 and a distal portion 1046 opposed from the proximal portion 1044. The detection layer 1006 may be connected to the distal portion 1046 of the web portion 1042 of the hat stringer 1040.

Figure 15:
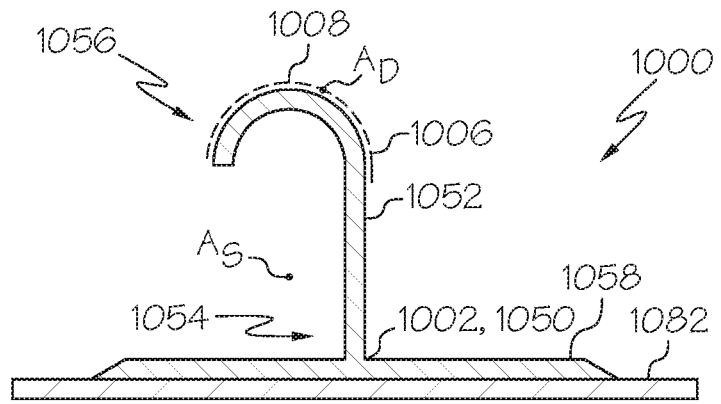
FIG. 15 is a side elevational view, in cross-section, of one variation to the composite structure shown in FIG. 14.

As shown in FIG. 15, in one variation, the composite body 1002 of the composite structure 1000 may be a J-type stringer 1050. The J-type stringer 1050 may include a base portion 1058 and a J-shaped web portion 1052. The base portion 1058 may be connected to an aircraft skin 1082 or other underlying structure. The web portion 1052 may include a proximal portion 1054 connected to the base portion 1058 and a distal portion 1056 opposed from the proximal portion 1054. The detection layer 1006 may be connected to the distal portion 1056 of the web portion 1052 of the J-type stringer 1050.

Figure 16:
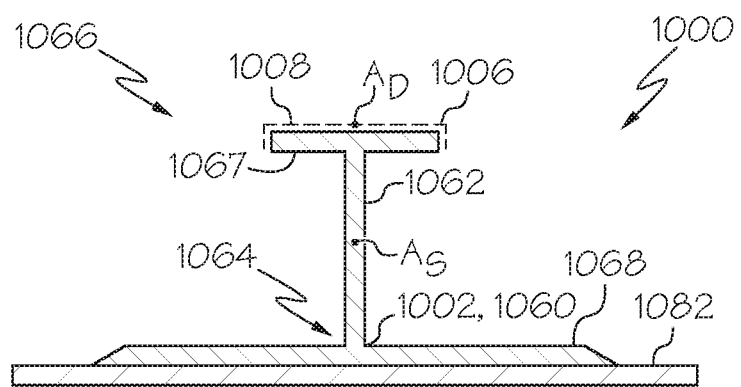
FIG. 16 is a side elevational view, in cross-section, of another variation to the composite structure shown in FIG. 14.

As shown in FIG. 16, in another variation, the composite body 1002 of the composite structure 1000 may be an I-type stringer 1060. The I-type stringer 1060 may include a base portion 1068 and a T-shaped web portion 1062. The base portion 1068 may be connected to an aircraft skin 1082 or other underlying structure. The web portion 1062 may include a proximal portion 1064 connected to the base portion 1068 and a distal portion 1066 opposed from the proximal portion 1064. The distal portion 1066 of the web portion 1062 may include a cap 1067, and the detection layer 1006 may be connected to the distal portion 1066 of the web portion 1062 of the I-type stringer 1060 (e.g., to the cap 1067).

Figure 17:
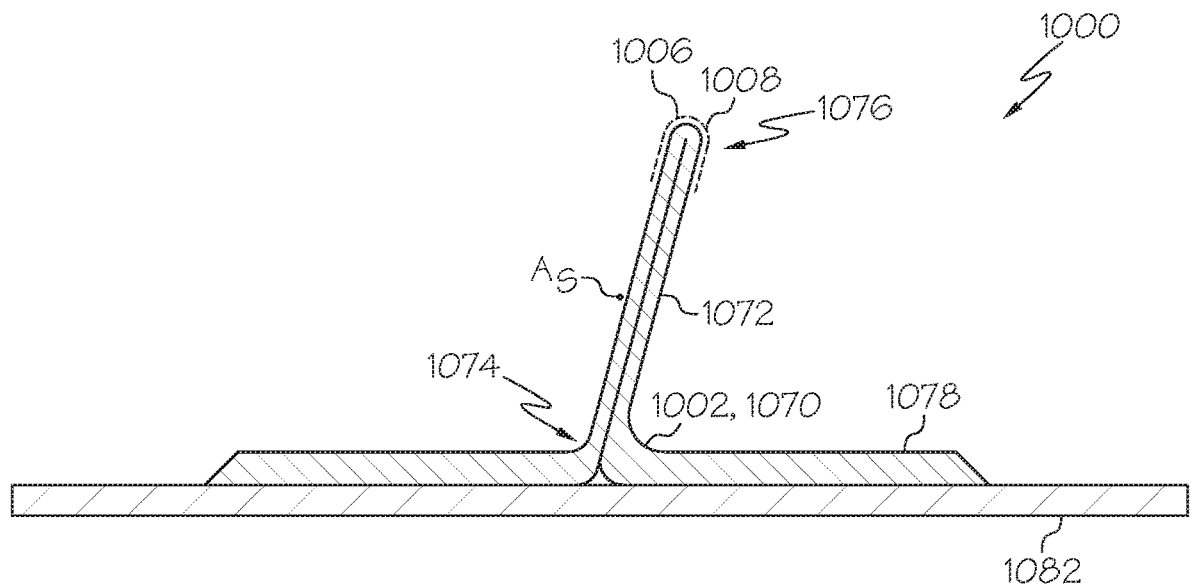
FIG. 17 is a side elevational view, in cross-section, of another variation to the composite structure shown in FIG. 14.
Figure 18:
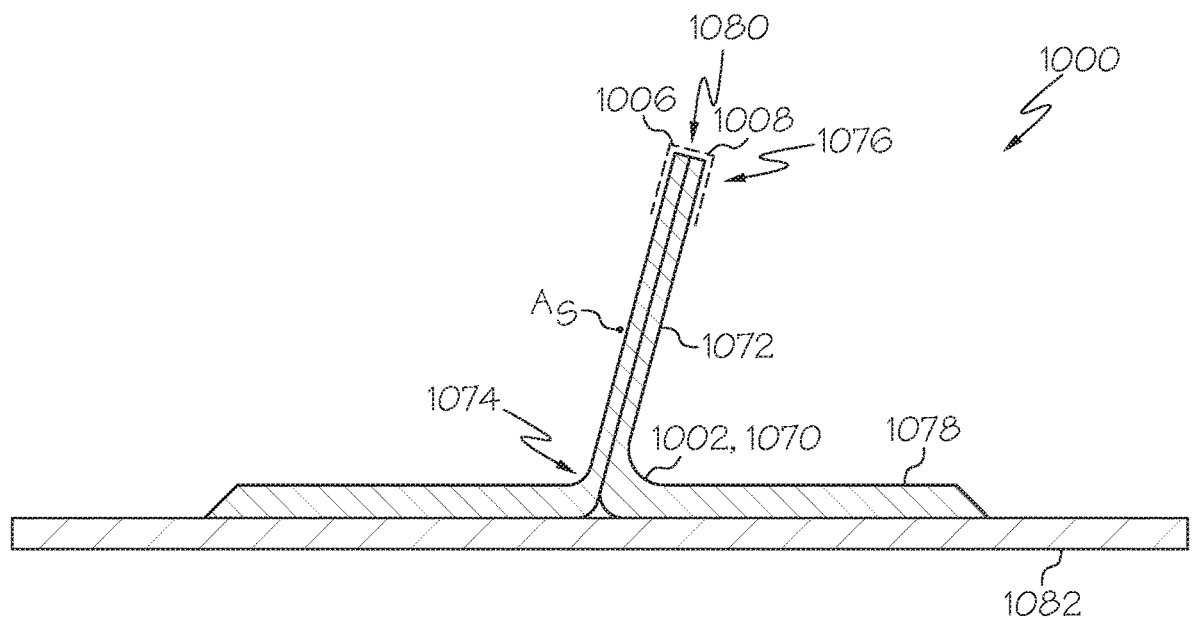
FIG. 18 is a side elevational view, in cross-section, of yet another variation to the composite structure shown in FIG. 14.

As shown in FIGS. 17 and 18, in yet another variation, the composite body 1002 of the composite structure 1000 may be a blade stringer 1070. The blade stringer 1070 may include a base portion 1078 and a web portion 1072. The base portion 1078 may be connected to an aircraft skin 1082 or other underlying structure. The web portion 1072 may include a proximal portion 1074 connected to the base portion 1078 and a distal portion 1076 opposed from the proximal portion 1074. The distal portion 1076 of the web portion 1072 may be untrimmed, as shown in FIG. 17, or may include a trimmed distal-most end 1080, as shown in FIG. 18. The detection layer 1006 may be connected to the distal portion 1076 of the web portion 1072 of the blade stringer 1070.

Figure 19:
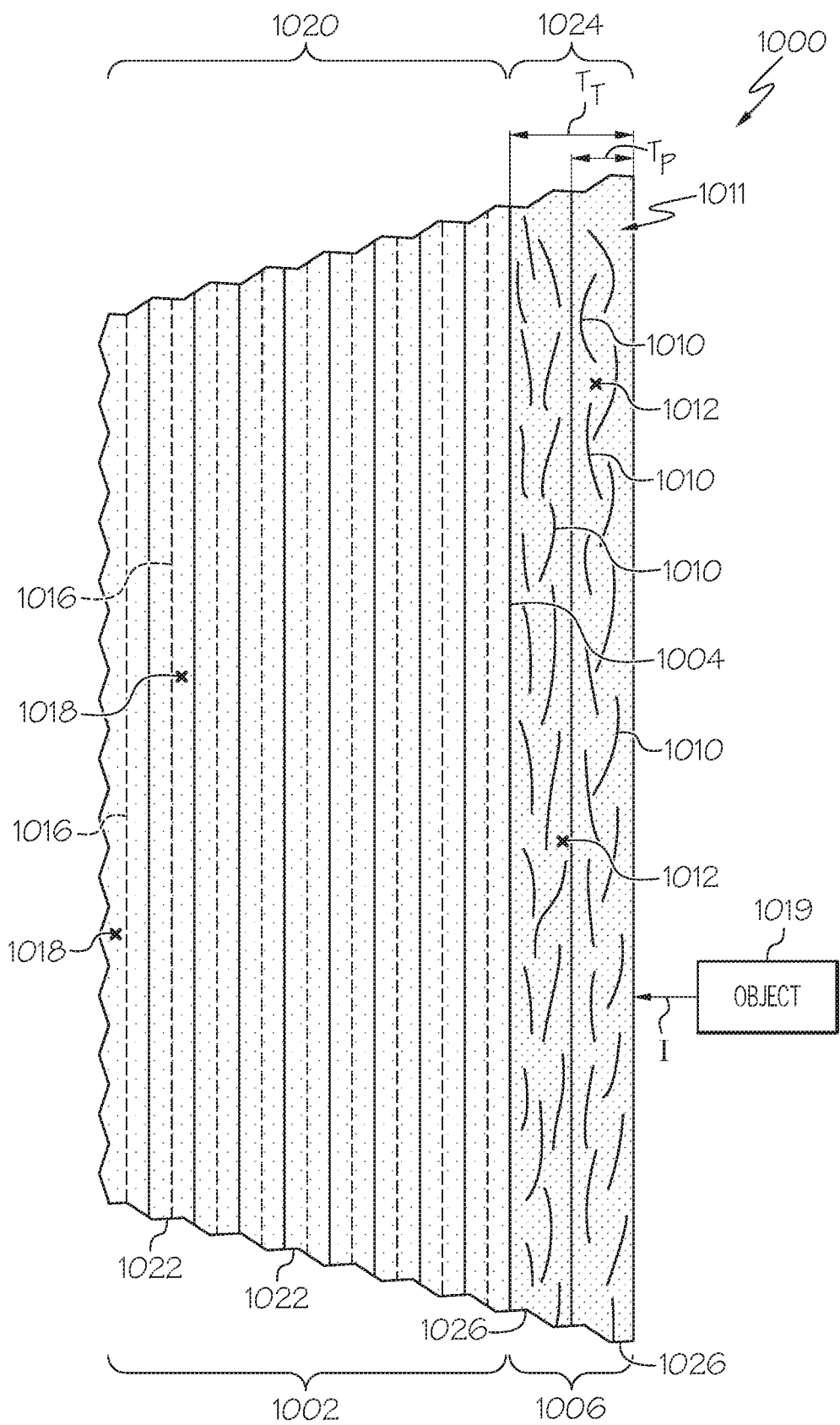
FIG. 19 is a detailed cross-sectional view of a portion of the composite structure shown in FIG. 14.

Referring to FIG. 19, the composite body 1002 of the composite structure 1000 may have a laminate structure 1020 that includes a plurality of composite plies 1022. Each ply 1022 of the laminate structure 1020 includes carbon fibers 1016 and a matrix material 1018. The carbon fibers 1016 may be embedded in the matrix material 1018. The matrix material 1018 may be a thermosetting resin, such as epoxy resin, or, alternatively, a thermoplastic resin, such as polyether ether ketone (PEEK), polyether ketone ketone (PEKK), polyphenaline sulfide (PPS), polyethylene, polypropylene, and polystyrene.

At this point, those skilled in the art will appreciate that the composition of the laminate structure 1020, as well as the number of plies 1022 forming the laminate structure 1020, may widely vary—they are design considerations dictated by, among other things, the intended application of the composite body 1002.

Still referring to FIG. 19, the detection layer 1006 of the composite structure 1000 may be connected to the outer surface 1004 of the composite body 1002. Therefore, in the event an object 1019 impacts (arrow I) the composite structure 1000 within the detection zone 1005 (FIGS. 13 and 14), the impact (arrow I) will most likely be received by the detection layer 1006. Because of the disclosed composition and structure of the detection layer 1006, such an impact (arrow I) may leave an indication on the composite structure 1000 that is substantially more visible as compared to the same impact (arrow I) occurring on a composite structure with the detection layer 1006 omitted.

Figure 20:
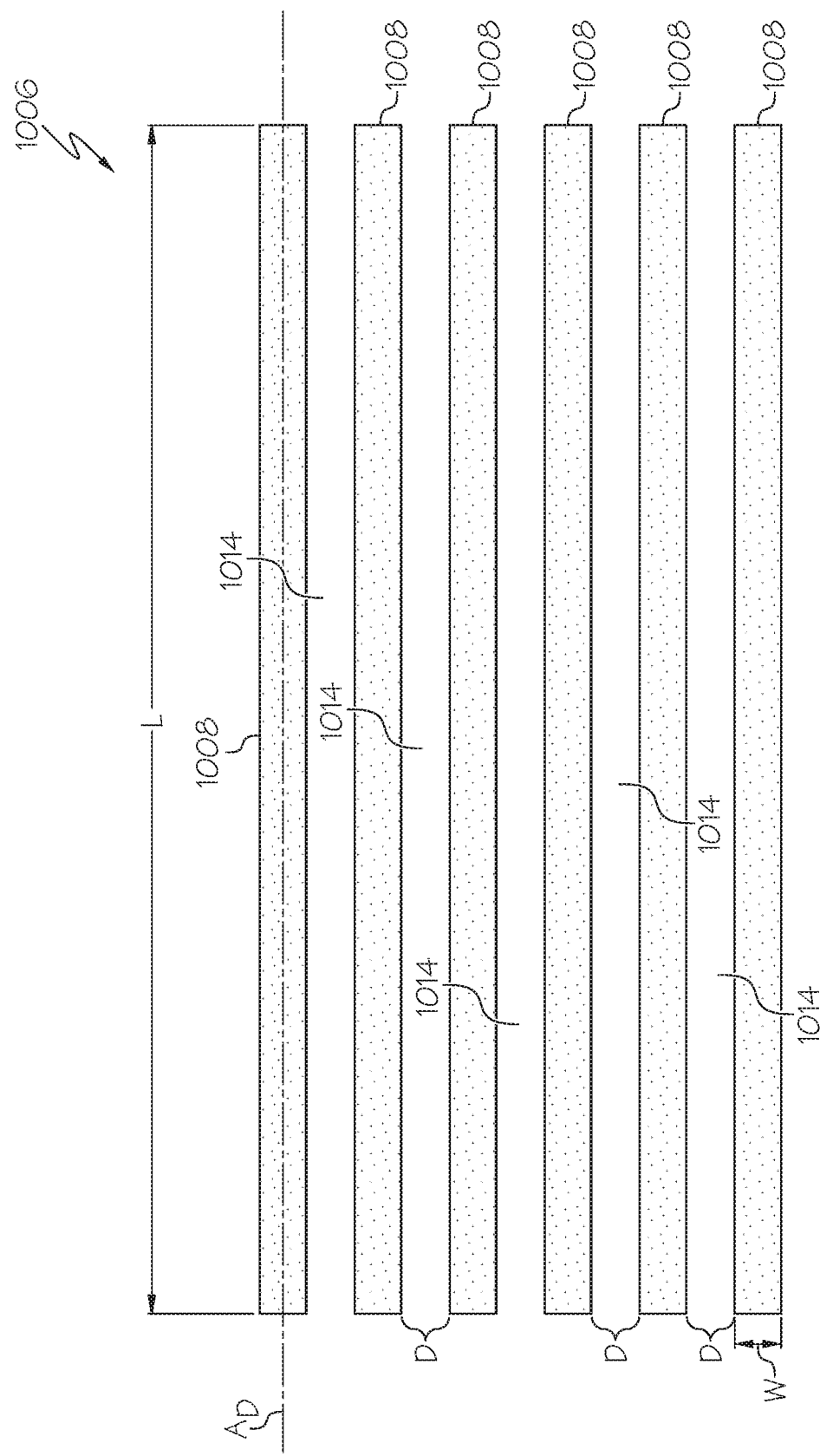
FIG. 20 is a plan view of the detection layer of the composite structure of FIGS. 13 and 14, shown prior to application of the detection layer to the composite body.

Referring to FIGS. 13, 14 and 20, the detection layer 1006 of the composite structure 1000 includes a plurality of strips 1008. As one non-limiting example, the detection layer 1006 may include 2 to 10 strips 1008. As another non-limiting example, the detection layer 1006 may include 5 to 50 strips 1008.

Each strip 1008 of the detection layer 1006 is elongated along a detection axis $A_D$, and the detection axis $A_D$ is substantially aligned with the span axis $A_S$ of the composite body 1002. For example, the detection axis $A_D$ of each strip 1008 may be parallel with the span axis $A_S$ of the composite body 1002.

As shown in FIG. 20, each strip 1008 of the detection layer 1006 is spaced a non-zero distance D apart from adjacent strips 1008, thereby defining a discontinuity 1014 between adjacent strips 1008 of the detection layer 1006. A portion of the composite body 1002 may be visible at the discontinuity 1014. In one expression, the non-zero distance D between adjacent strips 1008 may be at least 0.05 inch. In another expression, the non-zero distance D between adjacent strips 1008 may be at least 0.1 inch. In yet another expression, the non-zero distance D between adjacent strips 1008 may be at least 0.5 inch.

Still referring to FIG. 20, each strip 1008 of the detection layer 1006 may have a width W and a length L. The length L of each strip 1008 may depend on, among other things, the size and/or shape of the underlying composite body 1002 (FIG. 1). The width W of each strip 1008 may be a design consideration subject to optimization for a given composite body 1002 and application. In one specific, non-limiting aerospace application, the strips 1008 may have a width W ranging from about 0.1 inch (2.54 millimeters) to about 0.5 inch (12.7 millimeters), such as about 0.25 inch (6.35 millimeters).

Figure 21:
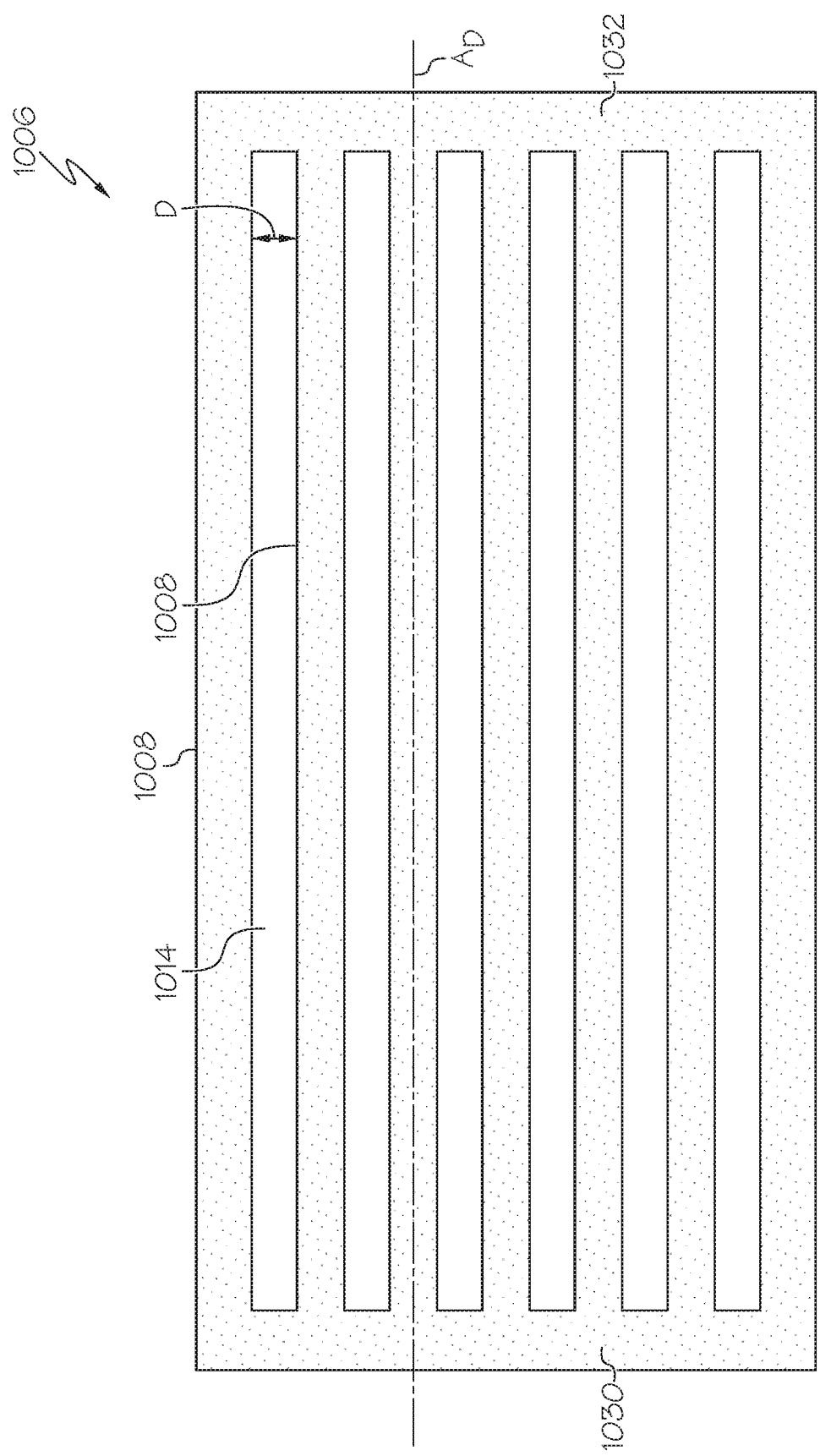
FIG. 21 is a plan view of one variation to the detection layer shown in FIG. 20.

In one alternative configuration, as shown in FIG. 21, the detection layer 1006 further includes a first extension member 1030 and a second extension member 1032, and wherein each strip 1008 of the detection layer 1006 extends from the first extension member 1030 to the second extension member 1032.

Referring again to FIG. 19, the detection layer 1006 of the composite structure 1000 may be formed from (or may include) a glass fiber-reinforced plastic 1011, which is commonly referred to as fiberglass. The glass fiber-reinforced plastic 1011 may include glass fibers 1010 and a matrix material 1012, wherein the glass fibers 1010 are embedded in the matrix material 1012. The matrix material 1012 may be a thermosetting resin, such as epoxy resin, or, alternatively, a thermoplastic resin, such as polyether ether ketone (PEEK), polyether ketone ketone (PEKK), polyphenaline sulfide (PPS), polyethylene, polypropylene, and polystyrene. As one specific, non-limiting example, the matrix material 1012 may be an epoxy resin.

As shown in FIG. 19, the detection layer 1006 may be a stacked structure 1024 that includes multiple plies 1026 of glass fiber-reinforced plastic 1011 (only two plies 1026 are shown in FIG. 19). While not specifically shown, it is also contemplated that the detection layer 1006 may include only a single ply 1026. Each ply 1026 of the detection layer 1006 may have a cross-sectional thickness $T_P$. As one non-limiting example, the cross-sectional thickness $T_P$ may range from about 0.003 inch (0.0762 millimeters) to about 0.015 inch (0.381 millimeters).

The detection layer 1006 may have a total cross-sectional thickness $T_T$, which may depend on the total number of plies 1026 and the cross-sectional thickness $T_P$ of each ply 1026. It is presently believed that the visual indication created by an impact (arrow I) within the detection zone 1005 (FIGS. 13 and 14) may become more substantial as the total cross-sectional thickness $T_T$ of the detection layer 1006 increases. However, the total weight of the composite structure 1000 also increases as the total cross-sectional thickness $T_T$ of the detection layer 1006 increases. Therefore, those skilled in the art will appreciate the need to optimize the total cross-sectional thickness $T_T$ of the detection layer 1006 based on the particular application. For example, in an aerospace application (e.g., for the hat stringer 1040 shown in FIGS. 13 and 14) the total cross-sectional thickness $T_T$ of the detection layer 1006 may range from about 0.003 inch (0.0762 millimeters) to about 0.050 inch (1.27 millimeters).

Also disclosed is a method for manufacturing the disclosed composite structure 1000.

Figure 22:
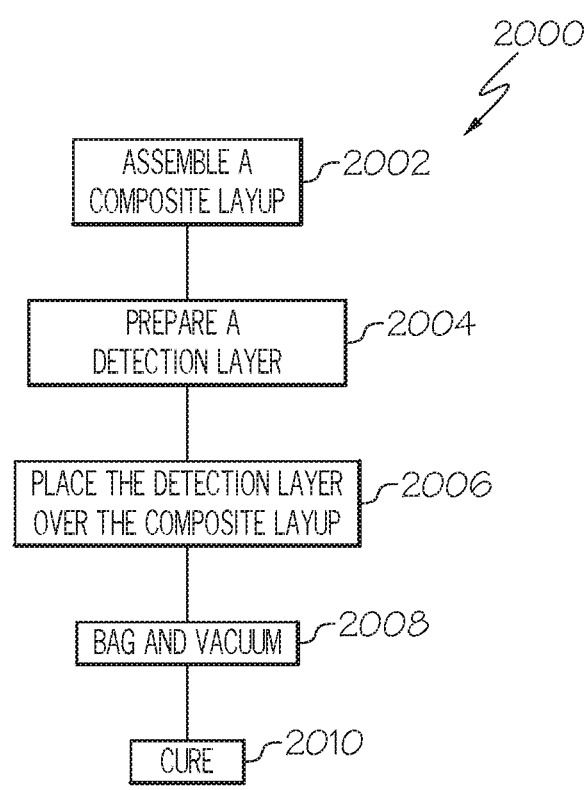
FIG. 22 is a flow diagram depicting another example of the disclosed method for manufacturing a composite structure.

Referring to FIG. 22, an example of the disclosed co-curing manufacturing method, generally designated 2000, may begin at Block 2002 with the step of laying up a plurality of composite plies 1022 (FIG. 19) to form the laminate structure 1020 (FIG. 19) of the composite body 1002 (FIG. 13). The composite plies 1022 may be prepreg plies and, therefore, merely require curing. However, it is also contemplated that a pre-form technique may be used, thereby requiring both resin infusion and curing.

At Block 2004, a detection layer 1006 (FIG. 20) may be prepared. Preparation of the detection layer 1006 may include assembling a stacked structure 1024 (FIG. 19) including multiple plies 1026 (FIG. 19) of glass fiber-reinforced plastic 1011 (FIG. 19). Preparation of the detection layer 1006 may further include cutting (e.g., die-cutting) the stacked structure 2024 to achieve the desired strips 1008.

At Block 2006, the detection layer 1006 may be placed over the composite body 1002, as shown in FIGS. 13 and 14, to form an uncured composite body/detection layer assembly. Placement of the detection layer 1006 may require consideration of the desired location of the detection zone 1005 of the resulting composite structure 1000.

At Block 2008, the composite body/detection layer assembly may optionally be exposed to a vacuum load. For example, the composite body/detection layer assembly may be placed into a vacuum bag and a vacuum may be drawn within the bag. The vacuum load may compact the composite body/detection layer assembly.

At Block 2010, the composite body/detection layer assembly may be cured. For example, the composite body/detection layer assembly may be placed into an autoclave set at a pre-determined temperature and may remain within the autoclave for a predetermined amount of time.

Thus, the disclosed co-curing manufacturing method 2000 may connect the detection layer 1006 to the composite body 1002 without the need for a secondary bonding process.

Figure 23:
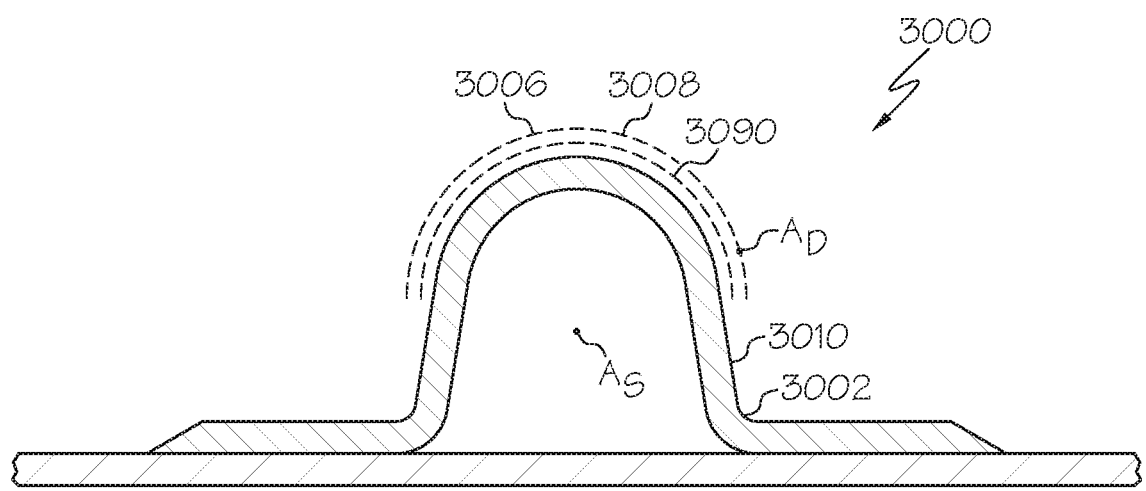
FIG. 23 is a side elevational view, in cross-section, of an alternative example of the disclosed composite structure.

Referring to FIG. 23, another example of the disclosed composite structure, generally designated 3000, may include a composite body 3002, a detection layer 3006 (having strips 3008) and an adhesive 3090. The composite body 3002 may include an outer surface 3010, and the detection layer 3006 may be connected to the outer surface 3010 of the composite body 3002 by way of the adhesive 3090.

Thus, the composite structure 3000 may be substantially similar to the composite structure 1000 shown in FIGS. 13 and 14. However, rather than effecting connection between the detection layer 1006 and the composite body 1002 by co-curing, as in the case for the composite structure 1000, the connection between the detection layer 3006 and the composite body 3002 of the composite structure 3000 may be effected by the adhesive 3090.

Various adhesives may be used in connection with the composite structure 3000. Those skilled in the art will appreciate that adhesive selection may require consideration of the composition of the composite body 3002 and the detection layer 3006, as well as other considerations, such as the intended application of the resulting composite structure 3000. Non-limiting examples of adhesives suitable for bonding a glass/epoxy detection layer 3006 to a carbon fiber reinforced plastic composite body 3002 include epoxies (e.g., one-part epoxies or two-part epoxies, including films, pastes and liquids), silicone adhesives, polyester adhesives, urethane adhesives and acrylic adhesives.

Also disclosed is a method for manufacturing the disclosed composite structure 3000.

Figure 24:
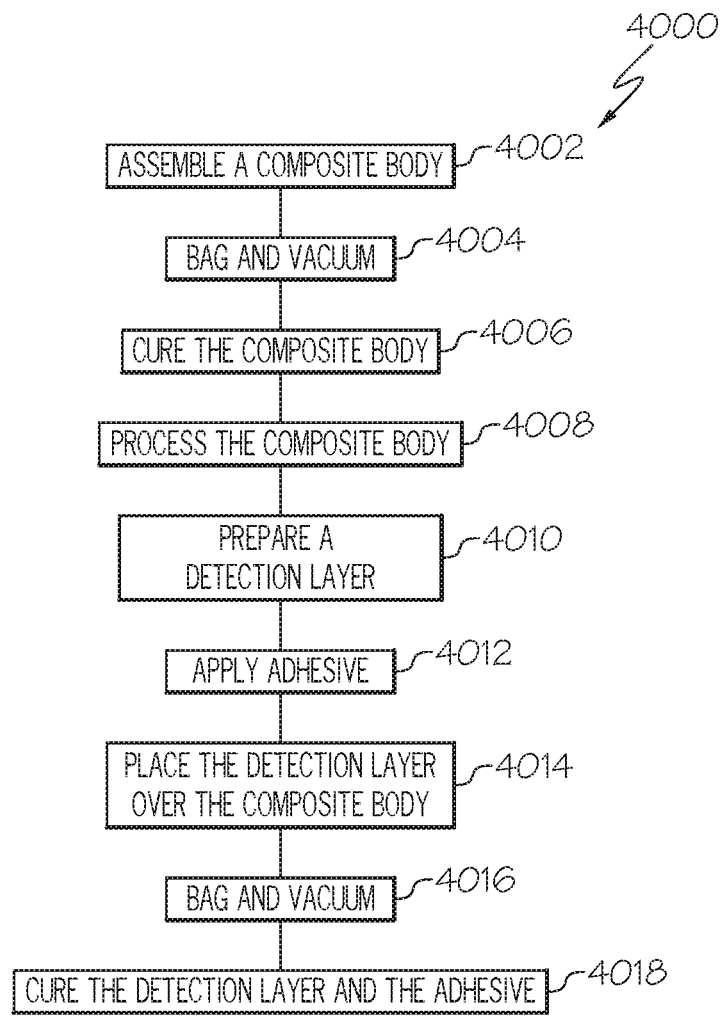
FIG. 24 is a flow diagram depicting another example of the disclosed method for manufacturing a composite structure.

Referring to FIG. 24, an example of the disclosed bonding manufacturing method, generally designated 4000, may begin at Block 4002 with the step of laying up a plurality of composite plies 1022 (FIG. 19) to form the laminate structure 1020 (FIG. 19) of the composite body 3002. The composite plies 1022 may be prepreg plies and, therefore, merely require curing. However, it is also contemplated that a pre-form technique may be used, thereby requiring both resin infusion and curing.

At Block 4004, the uncured composite body 3002 may optionally be exposed to a vacuum load. For example, the uncured composite body 3002 may be placed into a vacuum bag and a vacuum may be drawn within the bag. The vacuum load may compact the uncured composite body 3002.

At Block 4006, the composite body 3002 may be cured. For example, the composite body 3002 may be placed into an autoclave set at a pre-determined temperature for a predetermined amount of time.

At Block 4008, the composite body 3002 may be processed, such as by cutting/trimming the composite body 3002, surface preparation (e.g., for receiving an adhesive) and/or connecting additional members to the composite body 3002.

At Block 4010, a detection layer 3006 may be prepared, as is disclosed herein.

At Block 4012, an adhesive 3090 (FIG. 23) may be applied. The adhesive 3090 may be applied to the composite body 3002, to the detection layer 3006, or to both the composite body 3002 and the detection layer 3006.

At Block 4014, the detection layer 3006 may be placed over the composite body 3002.

At Block 4016, the composite body 3002/adhesive 3090/detection layer 3006 assembly (see FIG. 23) may optionally be exposed to a vacuum load.

At Block 4018, the composite body 3002/adhesive 3090/detection layer 3006 assembly (see FIG. 23) may be cured. As one example, curing may include allowing the composite body 3002/adhesive 3090/detection layer 3006 assembly to set for a predetermined amount of time. As another example, curing may include heating the composite body 3002/adhesive 3090/detection layer 3006 assembly, such as in an autoclave. As yet another example, curing may include exposing the composite body 3002/adhesive 3090/detection layer 3006 assembly to a particular wavelength of electromagnetic radiation (e.g., ultraviolet light).

Thus, the disclosed bonding manufacturing method 4000 may be used as an alternative to the disclosed co-curing manufacture method 2000.

Figure 25:
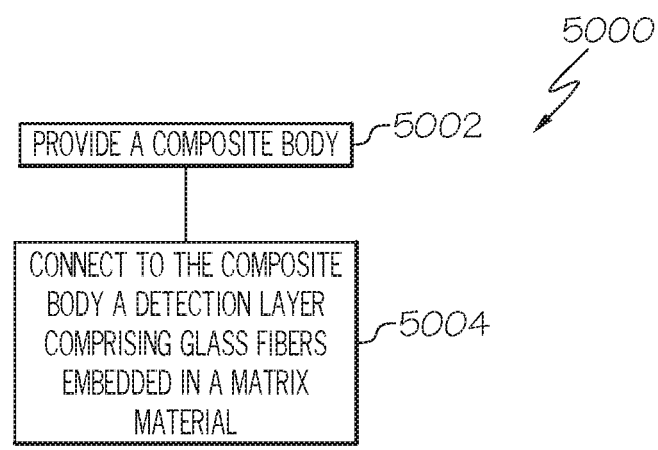
FIG. 25 is a flow diagram depicting another example of the disclosed method for barely visible impact damage detection.

Referring now to FIG. 25, an example of the disclosed method for barely visible impact damage detection, generally designated 5000, may begin at Block 5002 with the step of providing a composite body. At Block 5004, a detection layer may be connected to the outer surface of the composite body. The detection layer may include strips having a detection axis $A_D$ that is substantially aligned with the span axis $A_S$ of the composite body.

Figure 26:
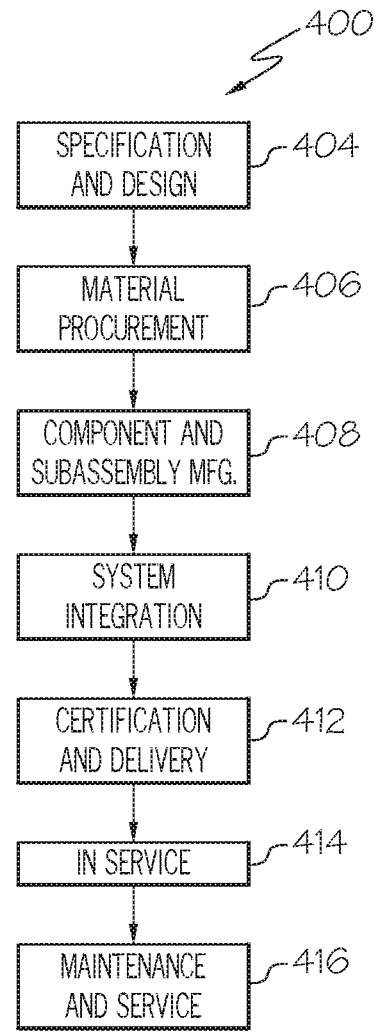
FIG. 26 is flow diagram of an aircraft manufacturing and service methodology.

Examples of the disclosure may be described in the context of an aircraft manufacturing and service method 400, as shown in FIG. 26, and an aircraft 402, as shown in FIG. 27. During pre-production, the aircraft manufacturing and service method 400 may include specification and design 404 of the aircraft 402 and material procurement 406. During production, component/subassembly manufacturing 408 and system integration 410 of the aircraft 402 takes place. Thereafter, the aircraft 402 may go through certification and delivery 412 in order to be placed in service 414. While in service by a customer, the aircraft 402 is scheduled for routine maintenance and service 416, which may also include modification, reconfiguration, refurbishment and the like.

Each of the processes of method 400 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 27, the aircraft 402 produced by example method 400 may include an airframe 418 with a plurality of systems 420 and an interior 422. Examples of the plurality of systems 420 may include one or more of a propulsion system 424, an electrical system 426, a hydraulic system 428, and an environmental system 430. Any number of other systems may be included.

The disclosed composite structure and method for barely visible impact damage detection may be employed during any one or more of the stages of the aircraft manufacturing and service method 400. As one example, the disclosed composite structure and method for barely visible impact damage detection may be employed during material procurement 406. As another example, components or subassemblies corresponding to component/subassembly manufacturing 408, system integration 410, and or maintenance and service 416 may be fabricated or manufactured using the disclosed composite structure and method for barely visible impact damage detection. As another example, the airframe 418 and/or the interior 422 may be constructed using the disclosed composite structure and method for barely visible impact damage detection. Also, one or more apparatus examples, method examples, or a combination thereof may be utilized during component/subassembly manufacturing 408 and/or system integration 410, for example, by substantially expediting assembly of or reducing the cost of an aircraft 402, such as the airframe 418 and/or the interior 422. Similarly, one or more of system examples, method examples, or a combination thereof may be utilized while the aircraft 402 is in service, for example and without limitation, to maintenance and service 416.

The disclosed composite structure and method for barely visible impact damage detection are described in the context of an aircraft; however, one of ordinary skill in the art will readily recognize that the disclosed composite structure and method for barely visible impact damage detection may be utilized for a variety of vehicles. For example, implementations of the examples described herein may be implemented in any type of vehicle including, e.g., helicopters, passenger ships, automobiles and the like.

Although various examples of the disclosed composite structure and method for barely visible impact damage detection have been shown and described, modifications may occur to those skilled in the art upon reading the specification. The present application includes such modifications and is limited only by the scope of the claims.

What is claimed is:

1. A composite structure comprising:
   a composite body having an outer surface, wherein the composite body is elongated along a span axis; and
   a detection layer connected to the outer surface of the composite body, the detection layer comprising a plurality of strips, each strip of the plurality of strips extending from a first extension member to a second extension member of the detection layer, each strip of the plurality of strips having a length, said first extension member and said second extension member extending along a longitudinal axis of the detection layer and being spaced from each other by a distance approximately equal to the length, wherein each strip of the plurality of strips:
   comprises a plurality of glass fibers embedded in a matrix material,
   is elongated along a detection axis, the detection axis being substantially aligned with the span axis,
   is spaced a non-zero distance apart from adjacent strips of the plurality of strips such that a discontinuity is defined between adjacent strips of the plurality of strips, and
   has a width that is approximately equal to the non-zero distance between each strip of the plurality of strips.

2. The composite structure of claim 1 wherein the detection axis is parallel with the span axis.

3. The composite structure of claim 1 wherein the composite body comprises a plurality of carbon fibers embedded in a matrix material.

4. The composite structure of claim 1 wherein the composite body comprises a laminate structure comprising a plurality of composite plies, wherein each ply of the plurality of composite plies comprises a plurality of carbon fibers and a matrix material.

5. The composite structure of claim 1 wherein the detection layer has a total cross-sectional thickness ranging from about 0.003 inch to about 0.050 inch.

6. The composite structure of claim 1 wherein the detection layer comprises a stacked structure comprising at least two plies.

7. The composite structure of claim 6 wherein at least one ply of the stacked structure comprises a cross-sectional thickness ranging from about 0.003 inch to about 0.015 inch.

8. The composite structure of claim 1 wherein the non-zero distance is at least 0.05 inch.

9. The composite structure of claim 1 wherein a portion of the composite body is visible at the discontinuity.

10. The composite structure of claim 1 wherein the composite body is configured as a blade stringer comprising:
 a web portion having a proximal portion and a distal portion; and
 a base portion connected to the proximal portion of the web portion,
 wherein the detection layer is connected to the distal portion of the web portion.

11. The composite structure of claim 10 wherein the distal portion of the web portion of the blade stringer comprises a trimmed distal-most end.

12. The composite structure of claim 1 further comprising an aircraft skin, wherein the composite body is connected to the aircraft skin.

13. An aircraft comprising the composite structure of claim 1.

14. The composite structure of claim 1 wherein the detection layer has a ladder-like configuration.

15. The composite structure of claim 1, wherein the plurality of strips comprises between 2 to 10 strips.

16. The composite structure of claim 1, wherein the non-zero distance is about 0.1 inch to about 0.5 inch.

17. The composite structure of claim 1, wherein the detection layer and composite body are connected by co-curing.

18. The composite structure of claim 1, wherein the detection layer and composite body are connected by an adhesive.

19. The composite structure of claim 10, wherein the detection layer is folded over the distal end of the web portion.

20. The composite structure of claim 1, wherein each discontinuity between each strip is substantially parallel to each strip.

* * * * *